(12) United States Patent
Fukui et al.

(10) Patent No.: US 8,765,825 B2
(45) Date of Patent: Jul. 1, 2014

(54) METHOD FOR MANUFACTURING ANION EXCHANGE RESIN, ANION EXCHANGE RESIN, METHOD FOR MANUFACTURING CATION EXCHANGE RESIN, CATION EXCHANGE RESIN, MIXED BED RESIN, AND METHOD FOR MANUFACTURING ULTRAPURE WATER FOR WASHING ELECTRONIC COMPONENT MATERIAL

(75) Inventors: Takeo Fukui, Tokyo (JP); Tetsuo Mizuniwa, Tokyo (JP); Kazuhiko Tokunaga, Fukuoka (JP); Masako Yasutomi, Fukuoka (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 13/466,663

(22) Filed: May 8, 2012

(65) Prior Publication Data

US 2012/0255911 A1    Oct. 11, 2012

Related U.S. Application Data

(62) Division of application No. 12/596,458, filed as application No. PCT/JP2008/057345 on Apr. 15, 2008, now Pat. No. 8,476,324.

(30) Foreign Application Priority Data

Apr. 19, 2007 (JP) ................. 2007-110652
Apr. 19, 2007 (JP) ................. 2007-110653
Apr. 19, 2007 (JP) ................. 2007-110654

(51) Int. Cl.
*B01J 41/14*    (2006.01)

(52) U.S. Cl.
USPC ............. 521/29; 521/30; 521/32; 521/38; 210/660

(58) Field of Classification Search
USPC ............. 521/29, 30, 32, 38; 210/660
See application file for complete search history.

(56) References Cited

U.S. PATENT DOCUMENTS

2,760,941 A * 8/1956 Iler .................. 521/150
2,857,311 A * 10/1958 Thurmon et al. ......... 424/78.05

(Continued)

FOREIGN PATENT DOCUMENTS

EP    1078940 A1 * 2/2001
JP    50-130688    10/1975

(Continued)

OTHER PUBLICATIONS

U.S. Appl. No. 13/466,446, filed May 8, 2012, Fukui, et al.

(Continued)

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

The invention relates to a method for manufacturing an anion exchange resin, wherein the method includes the step of contacting a water soluble polymer containing an anionic dissociative group with a resin to produce an anion exchange resin. In the method, an amount of contact of the water soluble polymer is 0.01 to 10 mmol/L, in terms of an amount of the anionic dissociative group, relative to 1 liter of the anion exchange resin, and a wafer surface flatness (Rms) of the anion exchange resin is 4 Å or less, determined by a silicon wafer test.

10 Claims, 3 Drawing Sheets

(56) References Cited

U.S. PATENT DOCUMENTS

| | | | | |
|---|---|---|---|---|
| 5,500,126 A | * | 3/1996 | Fries | 210/668 |
| 5,726,210 A | | 3/1998 | Teraue et al. | |
| 5,760,097 A | * | 6/1998 | Li et al. | 521/61 |
| 2004/0016702 A1 | * | 1/2004 | Hennessy et al. | 210/660 |
| 2004/0018559 A1 | * | 1/2004 | Lau et al. | 435/7.1 |

FOREIGN PATENT DOCUMENTS

| | | | |
|---|---|---|---|
| JP | 59-66403 A | | 4/1984 |
| JP | 1-315349 | | 12/1989 |
| JP | 2 115046 | | 4/1990 |
| JP | 5 49948 | | 3/1993 |
| JP | 7 116525 | | 5/1995 |
| JP | 7-150054 | | 6/1995 |
| JP | 7 289924 | | 11/1995 |
| JP | 7-289924 | * | 11/1995 |
| JP | 7-330818 A | | 12/1995 |
| JP | 8-208744 | | 8/1996 |
| JP | 9-150066 | | 6/1997 |
| JP | 09-221523 | | 8/1997 |
| JP | 9-255730 | | 9/1997 |
| JP | 10 137736 | | 5/1998 |
| JP | 10 202118 | | 8/1998 |
| JP | 10 508061 | | 8/1998 |
| JP | 1 078 940 | | 2/2001 |
| JP | 2001-31712 | * | 2/2001 |
| JP | 2001 31712 | | 2/2001 |
| JP | 2002-35607 | | 2/2002 |
| JP | 2002-506089 | | 2/2002 |
| JP | 2002-102719 | * | 4/2002 |
| JP | 2002 102719 | | 4/2002 |
| JP | 2002-136882 A | | 5/2002 |
| JP | 2003-211004 | | 7/2003 |
| JP | 2003 334550 | | 11/2003 |
| JP | 2004-206899 A | | 7/2004 |
| JP | 2005-517719 | | 6/2005 |
| JP | 2005-519428 | | 6/2005 |
| JP | 2006-328290 A | | 12/2006 |

OTHER PUBLICATIONS

Office Action issued Jan. 8, 2013 in Japanese Patent Application No. 2007-110653.
Japanese Office Action issued Dec. 18, 2012 in corresponding Japanese Application No. 02007-110654 (with an English Translation).
Japanese Office Action issued Mar. 21, 2012 in patent application No. 2008-105848.
Japanese Office Action issued May 21, 2013, in Japan Patent Application No. 2008-105849.
Japanese Office Action Issued Apr. 30, 2013 in Patent Application No. 2012-114729.
Combined Office Action and Search Report issued Jul. 29, 2013 in Taiwanese Patent Application No. 097114152 (with English translation of category of cited documents).
Office Action issued on Jul. 16, 2013 in the corresponding Japanese Patent Application No. 2012-114729.
Japanese Office Action issued Nov. 5, 2013, in Japan Patent Application No. 2007-110653.
Office Action issued in the corresponding Japanese patent application No. 2008-105849 dated Apr. 15, 2014.

* cited by examiner

METHOD FOR MANUFACTURING ANION EXCHANGE RESIN, ANION EXCHANGE RESIN, METHOD FOR MANUFACTURING CATION EXCHANGE RESIN, CATION EXCHANGE RESIN, MIXED BED RESIN, AND METHOD FOR MANUFACTURING ULTRAPURE WATER FOR WASHING ELECTRONIC COMPONENT MATERIAL

CROSS-REFERENCE TO RELATED APPLICATIONS

This application is a divisional of U.S. application Ser. No. 12/596,458 filed Oct. 19, 2009, now U.S. Pat. No. 8,476,324 which is a National Stage of PCT/JP08/057,345 filed Apr. 15, 2008 and claims priority of Japanese Patent Application No. 2007-110652 filed Apr. 19, 2007, Japanese Patent Application No. 2007-110653 filed Apr. 19, 2007 and Japanese Patent Application No. 2007-110654 filed Apr. 19, 2007.

FIELD OF THE INVENTION

The present invention relates to an anion exchange resin including reduced leachables and a method for manufacturing the sate, a mixed bed resin including the anion exchange resin, and a method for manufacturing electronic component•material washing ultrapure water by using the anion exchange resin.

The present invention also relates to a cation exchange resin including reduced leachables and a method for manufacturing the same, a mixed bed resin including the cation exchange resin, and a method for manufacturing electronic component•material washing ultrapure water by using the cation exchange resin.

BACKGROUND OF THE INVENTION

Ion exchange resins have been used previously in wide industrial fields of not only cleaning of water, but also medicine, food, chemical industry, and the like. In general, ion exchange resins can be classified into anion exchange resins and cation exchange resins and each has a chemical structure in which an anion exchange group or a cation exchange group is introduced in a cross-linked three-dimensional polymeric base member.

Examples of well-known anion exchange groups include primary to tertiary amino groups and an ammonium group.

In general, the anion exchange resin is produced by subjecting a copolymer of a monovinyl aromatic monomer and a cross-linkable aromatic monomer to a reaction with a haloalkylating agent, so as to introduce a haloalkyl group, and thereafter, a reaction with an amine compound.

The performance required of the anion exchange resin is different depending on the use thereof. However, it is desired in common to have an appropriate exchange capacity and an appropriate water content.

Examples of well-known cation exchange groups include a sulfonic group, a carboxyl group, and a phosphonyl group.

In general, the cation exchange resin is produced by subjecting a copolymer of a monovinyl aromatic monomer and a cross-linkable aromatic monomer to a reaction with a sulfonation agent.

Previously, the ion exchange resin including a cross-linked copolymer as a base member have had a problem in that leachables of an organic material or the like occurs during the use thereof. Such a leachable from a resin causes invitation of coloring•poisoning of a liquid to be treated through separation or refining, inhibition of desalting•odor development•reduction in amount of treatment due to pollution of a surface of the resin, an increase in water content due to decomposition of the resin, and the like. In particular, regarding ultrapure water used for silicon wafer washing, electronic component•material washing, and the like, even when the amount of leachables is very small, such a leachable may be adsorbed by a silicon wafer surface and, thereby, a product may be adversely affected. Furthermore, the silicon wafer may be etched by such a leachable, and the surface flatness may be adversely affected.

Consequently, in the use for production of ultrapure water, an ion exchange resin, in which the amount of leachables from a resin is significantly small and, in particular, the degree of leachables of the substance causing etching of the silicon wafer is reduced, has been desired.

Examples of causes of an occurrence of leachables from the resin include the presence of impurities, e.g., unpolymerized monomer components (monomers), inadequately polymerized low-molecular-weight polymer components (dimers, trimers, oligomers), separable polymer components (linear polymers, polymer fine particles), and byproducts through polymerization reaction, which remain in the production of a cross-linked copolymer, in the first place. As for remaining impurities, in the case of a styrene based resin, for example, unpolymerized monomer components include a styrene monomer, divinylbenzene, ethylvinylbenzene, and the like. Inadequately polymerized low-molecular-weight polymer components include styrene dimers, styrene trimers, styrene oligomers, and the like. Separable polymer components include linear polystyrenes, polystyrene fine particles, and the like. Byproducts through polymerization reaction include formaldehyde, benzaldehyde, and the like.

However, no means effective for preventing such impurities from remaining has been known. In order to remove such impurities, a step to wash the impurities with distilled water or the like has been previously required after the production or before the use of the ion exchange resin or a synthesized adsorbent. Therefore, an increase in cost and complication of the steps have been invited.

As for another cause of an occurrence of leachables, it is mentioned that the cross-linked copolymer is decomposed due to oxidation or the like with the passage of time so as to generate decomposition products in the use or storage thereof.

In order to prevent generation of such decomposition products, a technology of introducing a substituent to give an antioxidant capability have been proposed previously (refer to, for example, Patent Documents 1 to 3). However, the effect thereof is not satisfactory.

On the other hand, regarding the exchange capacity of the ion exchange resin, in order to minimize the frequency of replacement of the resin, previously, there has been a tendency to desire an ion exchange resin having a large exchange capacity.

In particular, regarding the ion exchange resin for ultrapure water production, a water treatment is conducted at a high flow rate. Therefore, there has been a tendency to design the structure in such a way that the water to be treated diffuses into the inside of the ion exchange resin easily and the advantage in reaction rate is offered. That is, regarding the ion exchange resin for ultrapure water production, there has been a tendency to desire a resin having not only a large exchange capacity, but also a low degree of cross-linkage and a large water content.

Furthermore, Patent Document 4 describes the possibility that a substance having a positive zeta potential relates to a proportion defective in semiconductor production to a great extent, and the substance having a positive zeta potential is derived from a strongly basic anion exchange resin. However, the evaluation in Patent Document 4 employs the degree of stains of a silicon wafer as the reference and, therefore, does not reach the evaluation at a strict level, such as the quality of flatness of the silicon wafer. Moreover, Patent Document 4 discloses a method in which the substance having a positive zeta potential is reduced by employing a mixed bed with a cation exchange resin. However, a method for reducing leachables from the anion exchange resin alone or a method for reducing substances which etch a silicon wafer is not disclosed.

That is, in the past, there is no related art in which an improvement of an ion exchange resin used for production of ultrapure water is considered from a strict viewpoint of an influence on the flatness of a silicon wafer surface.

In addition, Patent Document 5 discloses a method for suppressing leachables taking the advantage of sulfone cross-linking reaction at the stage of sulfonation. However, regarding the cation exchange resin for production of ultrapure water, in particular, production of electronic component•material washing ultrapure water, a further improvement is desired in the effect thereof.

On the other hand, independently of the ultrapure water production technology, in the case where the anion exchange resin and the cation exchange resin are used in the mixed bed, the volume of the mixed bed resin formed from the cation exchange resin and the anion exchange resin increases excessively because of an "agglomeration (clumping) phenomenon" which occurs between the cation exchange resin and the anion exchange resin, so as to cause a handling problem. As for a technology for preventing this agglomeration (clumping), a method in which an anion exchange resin is treated with a water-soluble polymer containing an anionic dissociative group has been disclosed (Patent Document 6). However, this strictly relates to the technology for preventing the agglomeration (clumping) and does not relate to an improvement technology, which suppresses an influence on the flatness of a silicon wafer surface, for production of an ion exchange resin.

Patent Document 1: European Patent Application Publication No. 1078940 A1
Patent Document 2: Japanese Unexamined Patent Application Publication No. 2-115046
Patent Document 3: Japanese Unexamined Patent Application Publication No. 10-137736
Patent Document 4: Japanese Unexamined Patent Application Publication No. 2003-334550
Patent Document 5: Japanese Unexamined Patent Application Publication (Translation of PCT Application) No. 10-508061
Patent Document 6: Japanese Patent Application No. 9-19964

On the basis of the above-described related art, regarding the ion exchange resin (anion exchange resin, cation exchange resin) including a cross-linked copolymer, a technology for preventing remaining of impurities and generation of decomposition products and suppressing an occurrence of a leachable during the use has been desired.

Furthermore, regarding the anion exchange resin including a cross-linked copolymer, a technology for reducing leachables from a resin for the purpose of suppressing the influence on the flatness of the silicon wafer has been still more desired than ever.

The present invention has been made in consideration of the above-described problems. Accordingly, it is an object of the present invention to provide an ion exchange resin, in which remaining of impurities and generation of decomposition products are suppressed and leachables are reduced and, in particular, which is capable of realizing reduction of leachables to a level not easily deteriorating the flatness of the silicon wafer surface, a method for manufacturing the same, as well as a mixed bed resin including the ion exchange resin, and a method for manufacturing electronic component•material washing ultrapure water by using the ion exchange resin.

DISCLOSURE OF INVENTION

The present inventors conducted intensive research in consideration of the above-described problems and, as a result, obtained the following findings on an anion exchange resin.

It was found that the above-described object was able to be achieved effectively by using an anion exchange resin having a small exchange capacity as compared with the conventional anion exchange resin, which tended to have a large exchange capacity and a large water content, as described above, under a specific relationship with the water content.

Furthermore, it was found that the following method was effective for manufacturing the anion exchange resin having a small exchange capacity as compared with that of the conventional anion exchange resin.
(i) Regarding an anion exchange resin obtained by using a step of haloalkylating a cross-linked copolymer of a monovinyl aromatic monomer and a cross-linkable aromatic monomer, the haloalkyl group introduction ratio is reduced than ever at the stage of haloalkylation.
(ii) The stage of haloalkylation is conducted under a suppressed reaction condition, for example, the reaction condition in which the amount of catalyst is reduced, the amount of reaction solvent is increased, the concentration of the catalyst is reduced, and the like.

The present inventors also found that the anion exchange resin having a $\Delta$TOC measurement value based on a specific ultrapure water flow test less than or equal to a specific value was able to achieve the above-described object effectively.

Moreover, it was found that high purity ultrapure water, in which an occurrence of a leachable was suppressed significantly, was able to be produced by using the above-described anion exchange resin and a mixed bed resin formed by using the anion exchange resin.

In addition, it was found that an anion exchange resin having reduced leachables and not easily causing deterioration of the flatness of the silicon wafer surface was obtained by producing the anion exchange resin while a water-soluble polymer containing an anionic dissociative group, which had been previously used as an agglomeration (clumping) prevention agent, was added in the production process.

Furthermore, the present inventors obtained the following findings on a cation exchange resin.

A cation exchange resin was synthesized by conducting sulfonation through the use of a cross-linked copolymer, which was produced by copolymerizing a monovinyl aromatic monomer and a cross-linkable aromatic monomer and which had a content of leachable compound of 400 µg or less relative to 1 g of the cross-linked copolymer, and as a result, it was found that a cation exchange resin having a $\Delta$TOC measurement value based on a specific ultrapure water flow test less than or equal to a specific value and containing reduced leachable compounds was able to be obtained.

Moreover, it was found that high purity electronic component•material washing ultrapure water, in which an occurrence of an eluate was suppressed significantly, was able to be produced by using the above-described cation exchange resin and a mixed bed resin formed by using the cation exchange resin.

That is, the gist of the present invention resides in the following items [1] to [26].

[1] A method for manufacturing an anion exchange resin characterized by including the following steps (1-a) to (1-e) of:

(1-a) obtaining a cross-linked copolymer by copolymerizing a monovinyl aromatic monomer and a cross-linkable aromatic monomer, (1-b) specifying the content of the leachable compound represented by the following formula (I) to be 400 μg or less relative to 1 g of the cross-linked copolymer of the monovinyl aromatic monomer and the cross-linkable aromatic monomer,

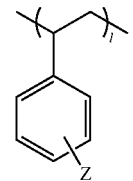

(I)

in the formula (I), Z represents a hydrogen atom or an alkyl group, and 1 represents a natural number, (1-c) haloalkylating the cross-linked copolymer having a content of the above-described leachable compound of 400 μg or less relative to 1 g of the cross-linked copolymer, so as to introduce 80 percent by mole or less of haloalkyl group relative to the monovinyl aromatic monomer, (1-d) removing the leachable compound represented by the following formula (II) from the haloalkylated cross-linked copolymer,

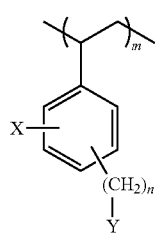

(II)

in the formula (II), X represents a hydrogen atom, a halogen atom, or an alkyl group which may be substituted by a halogen atom, Y represents a halogen atom, and m and n represent independently a natural number, and (1-e) subjecting the haloalkylated cross-linked copolymer, from which the above-described leachable compound has been removed, to a reaction with an amine compound.

[2] An anion exchange resin produced by the method for manufacturing an anion exchange resin according to the item [1].

[3] An anion exchange resin characterized in that the water content $W_{Cl}$ (percent by weight) and the exchange capacity $Q_{Cl}$ per unit volume (meq/ml-resin) measured on a Cl type basis satisfy any one of the following formulae (1) to (5).

$Q_{Cl} \leq 1.25$ (where $W_{Cl}<38$) (1)

$Q_{Cl} \leq 1.36$ (where $38 \leq W_{Cl}<42$) (2)

$Q_{Cl} \leq 1.2$ (where $42 \leq W_{Cl}<48$) (3)

$Q_{Cl} \leq 1.1$ (where $48 \leq W_{Cl}<55$) (4)

$Q_{Cl} \leq 0.8$ (where $55 \leq W_{Cl}$) (5)

[4] The anion exchange resin according to the item [2], wherein the water content $W_{Cl}$ (percent by weight) and the exchange capacity $Q_{Cl}$ per unit volume (meq/mL-resin) measured on a Cl type basis satisfy the following formula (8).

$Q_{Cl} \leq -0.021 W_{Cl}+2.28$ (8)

5. An anion exchange resin characterized in that the water content $W_{OH}$ (percent by weight) and the exchange capacity $Q_{OH}$ per unit volume (meq/mL-resin) measured on an OH type basis satisfy the following formula (6) or (7).

$Q_{OH} \leq 1.1$ (where $W_{OH}<66$) (6)

$Q_{OH} \leq 0.9$ (where $66 \leq W_{OH}$) (7)

[6] The anion exchange resin according to the item [2], wherein the water content $W_{OH}$ (percent by weight) and the exchange capacity $Q_{OH}$ per unit volume (meq/mL-resin) measured on an OH type basis satisfy the following formula (9).

$Q_{OH} \leq -0.018 W_{OH}+2.05$ (9)

[7] An anion exchange resin characterized by being obtained by subjecting a cross-linked copolymer, which is produced by copolymerizing a monovinyl aromatic monomer and a cross-linkable aromatic monomer, to haloalkylation and, thereafter, a reaction with an amine compound, wherein 80 percent by mole or less of haloalkyl group relative to the above-described monovinyl aromatic monomer is introduced through the above-described haloalkylation.

[8] The anion exchange resin according to the item [7], wherein the content of the leachable compound represented by the following formula (I) in the above-described cross-linked copolymer is 400 μg or less relative to 1 g of the cross-linked copolymer,

(I)

in the formula (I), Z represents a hydrogen atom or an alkyl group, and 1 represents a natural number.

[9] The anion exchange resin according to any one of the items [2] to [8], wherein the ΔTOC based on the ultrapure water flow test specified in the following item (A) is 0.5 ppb or less.

(A) Ultrapure Water Flow Test (1) Ultrapure water having a resistivity of 18 MΩ·cm or more and a water temperature of 20° C. or higher, and 40° C. or lower is filled into an empty measurement column having a diameter of 30 mm and a length of 1,000 mm under a room temperature condition, the ultrapure water is passed at SV of 30 hr$^{-1}$, and the TOC concentration (TOC$_0$) of the water at the measurement column outlet is measured.

(2) After 500 mL of the above-described anion exchange resin is poured and filled into the above-described measurement column, the above-described ultrapure water is passed through the column at SV of 30 hr$^{-1}$ under a room temperature condition, and the TOC concentration (TOC$_1$) of the water at the measurement column outlet is measured after 20 hours.

(3) The ΔTOC is calculated by the following formula.

ΔTOC(ppb)=TOC$_1$−TOC$_0$

[10] The anion exchange resin, according to any one of the items [2] to [9], which is a spherical anion exchange resin and which has a crush strength per particle of 7.5 N or more.

[11] An anion exchange resin characterized in that the ΔTOC based on the ultrapure water flow test specified in the following item (A) is 0.2 ppb or less.

(A) Ultrapure Water Flow Test (1) Ultrapure water having a resistivity of 18 MΩ·cm or more and a water temperature of 20° C. or higher, and 40° C. or lower is filled into an empty measurement column having a diameter of 30 mm and a length of 1,000 mm under a room temperature condition, the ultrapure water is passed at SV of 30 hr$^{-1}$, and the TOC concentration (TOC$_0$) of the water at the measurement column outlet is measured.

(2) After 500 mL of the above-described anion exchange resin is poured and filled into the above-described measurement column, the above-described ultrapure water is passed through the column at SV of 30 hr$^{-1}$ under a room temperature condition, and the TOC concentration (TOC$_1$) of the water at the measurement column outlet is measured after 20 hours.

(3) The ΔTOC is calculated by the following formula.

ΔTOC(ppb)=TOC$_1$−TOC$_0$

[12] An anion exchange resin characterized by being spherical and having a crush strength per particle of 7.5 N or more.

[13] The anion exchange resin according to any one of the items [2] to [12], wherein the volume increase ratio in the case where mixing with an anion exchange resin is conducted is 150% or less relative to the volume before mixing.

[14] The anion exchange resin, according to any one of the items [2] to [13], which is obtained through contact of a water-soluble polymer containing an anionic dissociative group.

[15] A method for manufacturing an anion exchange resin characterized by including the step of bringing a water-soluble polymer containing an anionic dissociative group into contact, wherein the amount of contact of the water-soluble polymer is 0.01 to 10 mmol/L in terms of an amount of anionic dissociative group of the water-soluble polymer relative to 1 liter of the anion exchange resin, and the wafer surface flatness determined by a silicon wafer test of the resulting anion exchange resin is 4 Å or less in terms of Rms.

[16] An anion exchange resin produced by the method for manufacturing an anion exchange resin according to the item [15].

[17] A mixed bed resin characterized by being formed by using the anion exchange resin according to any one of the items [2] to [14] and the item [16].

[18] A method for manufacturing an electronic component•material washing ultrapure water characterized by using the anion exchange resin according to any one of the items [2] to [14] and the item [16].

[19] A method for manufacturing a cation exchange resin characterized by including the following steps (2-a) to (2-c) of:

(2-a) obtaining a cross-linked copolymer by copolymerizing a monovinyl aromatic monomer and a cross-linkable aromatic monomer, (2-b) specifying the content of the leachable compound represented by the following formula (I) to be 400 μg or less relative to 1 g of the cross-linked copolymer obtained in the above-described step (2-a),

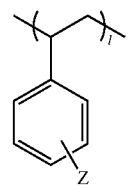

(I)

in the formula (I), Z represents a hydrogen atom or an alkyl group, and l represents a natural number, and (2-c) sulfonating the cross-linked copolymer having a content of the above-described leachable compound of 400 μg or less relative to 1 g of the cross-linked copolymer.

[20] The method for manufacturing a cation exchange resin according to the item [19], further comprising the following step (2-d) of (2-d) removing a leachable compound represented by the following formula (III) from the sulfonated cross-linked copolymer,

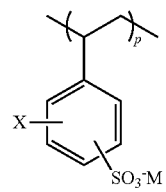

(III)

in the formula (III), X represents a hydrogen atom, a halogen atom, or an alkyl group which may be substituted by a halogen atom, M represents a hydrogen atom, a metal atom, or a quaternary ammonium group, and p represents a natural number.

[21] A cation exchange resin produced by the method for manufacturing a cation exchange resin according to the item [19] or [20].

[22] A cation exchange resin characterized in that the ΔTOC based on the ultrapure water flow test specified in the following item (A) is 1 ppb or less.

(A) Ultrapure Water Flow Test (1) Ultrapure water having a resistivity of 18 MΩ·cm or more and a water temperature of 20° C. or higher, and 40° C. or lower is filled into an empty measurement column having a diameter of 30 mm and a length of 1,000 mm under a room temperature condition, the ultrapure water is passed at SV of 30 hr$^{-1}$ and the TOC concentration (TOC$_0$) of the water at the measurement column outlet is measured.

(2) After 500 mL of the above-described cation exchange resin is poured and filled into the above-described measurement column, the above-described ultrapure water is passed through the column at SV of 30 hr$^{-1}$ under a room temperature condition, and the TOC concentration (TOC$_1$) of the water at the measurement column outlet is measured after 20 hours.

(3) The ΔTOC is calculated by the following formula.

ΔTOC(ppb)=TOC$_1$−TOC$_0$

[23] The cation exchange resin according to the item [21] or [22], characterized in that the volume increase ratio in the case where mixing with an anion exchange resin is conducted is 150% or less relative to the volume before mixing.

[24] The cation exchange resin, according to any one of the items [21] to [23], which is obtained through contact of a water-soluble polymer containing a cationic dissociative group.

[25] A mixed bed resin characterized by being formed by using the cation exchange resin according to any one of the items [21] to [24].

[26] A method for manufacturing an electronic component•material washing ultrapure water characterized by using the cation exchange resin according to any one of the items [21] to [24].

According to the present invention, an ion exchange resin, in which remaining of impurities and generation of decomposition products are suppressed and leachables are reduced, can be provided and high purity electronic component•material washing ultrapure water can be produced by using this ion exchange resin on an "as is" basis or a mixed bed resin including this ion exchange resin.

Furthermore, according to the present invention, an anion exchange resin, in which remaining of impurities and generation of decomposition products are suppressed and leachables are reduced and which does not allow the flatness of the silicon wafer surface to easily deteriorate, can be provided. Consequently, high purity ultrapure water can be produced by using this anion exchange resin on an "as is" basis or a mixed bed resin including this anion exchange resin.

According to the present invention, deterioration of the flatness of the silicon wafer surface is suppressed by treating the anion exchange resin with a water-soluble polymer containing the anionic dissociative group. The reason therefor is believed to be that the water-soluble polymer containing the anionic dissociative group captures leachables from the anion exchange resin.

That is, it is believed that polystyrene compounds having ammonium groups are primarily contained in the leachables from the anion exchange resin and they are captured by the anionic dissociative group of the water-soluble polymer through adsorption.

Moreover, as is disclosed in Patent Document 4 described above, it is believed that substances having positive zeta potentials stain silicon wafers. However, it is believed that the water-soluble polymer containing the anionic dissociative group has also an effect of capturing those leachables having positive zeta potentials and, therefore, stains of silicon wafer can be prevented.

It is believed that in the cation exchange resin according to the present invention, remaining of impurities is suppressed and an occurrence of leachable is reduced during the use because
1) high purity raw materials are used at the stage of polymerization,
2) specific leachable compounds, e.g., leachable polystyrene, are fixed at the stage of polymerization,
3) specific leachable compounds, e.g., leachable polystyrene, are removed through washing of the cross-linked polymer after polymerization, and
4) specific leachable compounds, e.g., leachable polystyrene sulfonate, are removed from the sulfonated cross-linked polymer.

That is, for example, in the leachable control method in Patent Document 5 described above, the cross-linkage of sulfone may undergo a hydrolysis reaction and, therefore, it is feared that leachables occur again. However, the technology of the present invention does not cause such a problem and, therefore, is satisfactorily excellent from the viewpoint of the effect.

DETAILED DESCRIPTION

Figure 1:
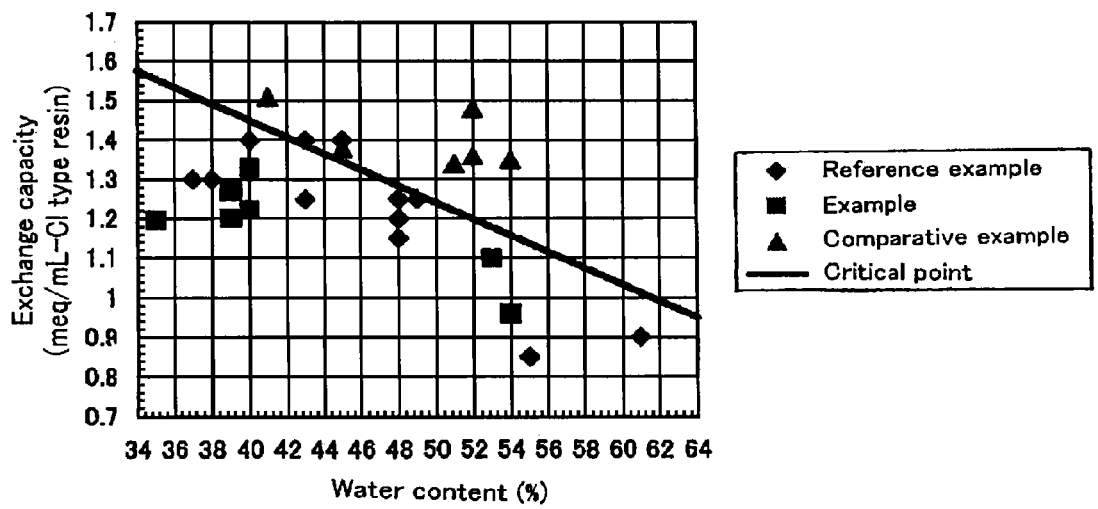
FIG. 1 is a graph showing the relationship between the water content and the exchange capacity of Cl type anion exchange resins of Examples, Comparative examples, and Reference examples in Experimental example A.

The embodiments of the present invention will be described below in detail. In this regard, the following description is an example of the embodiments of the present invention. The present invention is not limited to the following description within the range of the gist of the present invention.

[1] Method for Manufacturing Anion Exchange Resin

A method for manufacturing an anion exchange resin according to a first aspect of the present invention is characterized by including the following steps of (1-a) to (1-e):

(1-a) A step to obtain a cross-linked copolymer by copolymerizing a monovinyl aromatic monomer and a cross-linkable aromatic monomer;

(1-b) A step to specify the content of the leachable compound represented by the following formula (I) to be 400 μg or less relative to 1 g of the cross-linked copolymer of the monovinyl aromatic monomer and the cross-linkable aromatic monomer,

(I)

in the formula (I), Z represents a hydrogen atom or an alkyl group, and l represents a natural number;

(1-c) A step to haloalkylate the cross-linked copolymer having a content of the above-described leachable compound of 400 μg or less relative to 1 g of the cross-linked copolymer, so as to introduce 80 percent by mole or less of haloalkyl group relative to the above-described monovinyl aromatic monomer;

(1-d) A step to remove a leachable compound represented by the following formula (II) from the haloalkylated cross-linked copolymer,

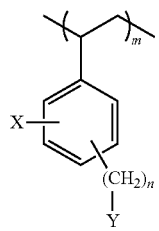

(II)

in the formula (II), X represents a hydrogen atom, a halogen atom, or an alkyl group which may be substituted by a halogen atom, Y represents a halogen atom, and m and n represent independently a natural number; and (1-e) A step to subject the haloalkylated cross-linked copolymer, from which the above-described leachables compound has been removed, to a reaction with an amine compound.

[1-1] (1-a) Step to Obtain Cross-Linked Copolymer by Copolymerizing Monovinyl Aromatic Monomer and Cross-Linkable Aromatic Monomer Examples of monovinyl aromatic monomers according to the present invention include alkyl-substituted styrenes, e.g., styrene, methyl styrene, and ethyl styrene, and halogen-substituted styrenes, e.g., bromostyrene. One type of them may be used alone, or at least two types may be used in combination. Among them, styrene, or a monomer primarily containing styrene is preferable.

Examples of cross-linkable aromatic monomers include divinylbenzene, trivinylbenzene, divinyltoluene, divinylnaphthalene, and divinylxylene. One type of them may be used alone, or at least two types may be used in combination. Among them, divinylbenzene is preferable.

Industrially produced divinylbenzene usually includes large amounts of ethylvinylbenzene (ethyl styrene) which is a byproduct, although such divinylbenzene can be used in the present invention.

The usage of the cross-linkable aromatic monomer is usually 0.5 to 30 percent by weight relative to a total weight of monomers, preferably 2.5 to 12 percent by weight, and further preferably 4 to 10 percent by weight. As the usage of the cross-linkable aromatic monomer increases and the degree of cross-linkage becomes higher, the oxidation resistance of the resulting anion exchange resin tends to be improved. On the other hand, if the degree of cross-linkage is too high, removal of leachable oligomers through water washing in a downstream operation tends to become insufficient. In this regard, in the case where a step to decrease the degree of conversion of the haloalkylation is conducted in the downstream (c) haloalkylation step, post-cross-linking reaction as a side reaction of the haloalkylation is also suppressed. Therefore, in order to complement it, a method, in which the amount of addition of the cross-linkable aromatic monomer in polymerization is increased, is employed favorably.

The copolymerization reaction between the monovinyl aromatic monomer and the cross-linkable aromatic monomer can be conducted by using a radical polymerization initiator on the basis of the publicly known technology.

As for the radical polymerization initiator, at least one type of dibenzoyl peroxide, lauroyl peroxide, t-butyl hydroperoxide, and azobisisobutyronitrile is used usually at 0.05 percent by weight or more, and 5 percent by weight or less relative to a total weight of monomers.

The manner of polymerization is not specifically limited and the polymerization can be conducted in various manners, e.g., solution polymerization, emulsion polymerization, and suspension polymerization. Among them, the suspension polymerization method is employed preferably because uniform beads-shaped copolymer is obtained. The suspension polymerization method can be conducted by using a solvent, a dispersion stabilizer, and the like, which are generally used for production of this type of copolymer, and selecting a publicly known reaction condition.

Furthermore, the polymerization temperature in the copolymerization reaction is usually room temperature (about 18° C. to 25° C.) or higher, preferably 40° C. or higher, and further preferably 70° C. or higher and usually 250° C. or lower, preferably 150° C. or lower, and further preferably 140° C. or lower. If the polymerization temperature is too high, depolymerization concurs and, thereby, the degree of completion of polymerization is reduced contrarily. If the polymerization temperature is too low, the degree of completion of polymerization becomes insufficient.

Moreover, the polymerization can be conducted in an atmosphere of the air or an inert gas. Nitrogen, carbon dioxide, argon, or the like can be used as the inert gas.

In addition, a polymerization method described in Japanese Unexamined Patent Application Publication No. 2006-328290 can also be used favorably.

Furthermore, a publicly known method for obtaining a cross-linked copolymer having a uniform particle diameter can also be used favorably.

For example, methods described in Japanese Unexamined Patent Application Publication No. 2002-35560, Japanese Unexamined Patent Application Publication No. 2001-294602, Japanese Unexamined Patent Application Publication No. 57-102905, and Japanese Unexamined Patent Application Publication No. 3-249931 can also be used favorably.

[1-2] (1-b) Step to Specify Content of Leachable Compound Having Specific Structure to be 400 μg or Less Relative to 1 g of Cross-Linked Copolymer The method for manufacturing an anion exchange resin according to the present invention includes a step to specify the content of the leachable compound represented by the following formula (I) (hereafter may be referred to as "leachable compound (I)") to be 400 μg or less, preferably 300 μg or less, and more preferably 200 μg or less relative to 1 g of the cross-linked copolymer before the cross-linked copolymer obtained in the chapter [1-1] is haloalkylated.

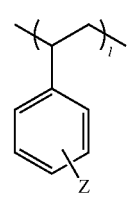

(I)

in the formula (I), Z represents a hydrogen atom or an alkyl group, and l represents a natural number.

Here, the alkyl group of Z is usually an alkyl group having the carbon number of 1 to 8, preferably a methyl group, an ethyl group, a propyl group, and a butyl group, and further preferably a methyl group and an ethyl group.

If the content of the above-described leachable compound (I) in the cross-linked copolymer to be subjected to haloalkylation exceeds 400 μg, an anion exchange resin, in which remaining of impurities and generation of decomposition products are suppressed and leachables are reduced, cannot be obtained. It is preferable that the content of the leachable compound (I) is smaller, and the lower limit thereof is usually about 50 μg.

In this regard, the above-described leachable compound (I) according to the present invention is a byproduct which is obtained in copolymerization of the monovinyl aromatic monomer and the cross-linkable aromatic monomer and which is unreacted or insufficiently reacted. This leachable compound (I) becomes a cause of leachables of ion exchange resin at the time of a product, and the weight average molecular weight in terms of polystyrene is usually 200 or more, and preferably 300 or more and usually 1,000,000 or less, and preferably 100,000 or less. In the case of a styrene based resin, examples of lower-molecular-weight polymer components, which have been polymerized insufficiently, include styrene dimers, styrene trimers, and styrene oligomers, and examples of separable polymer components include linear polystyrenes and polystyrene fine particles. Furthermore, examples of byproducts due to a chain transfer reaction in the polymerization reaction include lower-molecular-weight polymer components and separable polymer components, in which a polymerization inhibitor contained in a monomer is bonded.

The content of the above-described leachables compound (I) in the cross-linked copolymer can be determined by, for example, a leachable test described later in the section of examples.

The step (1-b) according to the present invention is conducted at the same time with the above-described step (1-a) by adjusting, in particular, the polymerization condition in the step (1-a). Moreover, after the polymerization, the resulting cross-linked copolymer is washed to remove the leachable compound (I) and, thereby, a cross-linked copolymer, in which the content of the leachable compound is reduced, can be obtained.

In the case where a cross-linked copolymer, in which the content of the leachable compound is reduced, is obtained by adjusting the polymerization condition in the above-described step (a), examples of methods for adjusting such a polymerization condition include the methods described below.

[1-2-1] Adjustment of Polymerization Temperature

As described above, if the polymerization temperature in the copolymerization reaction of the present invention is too high, depolymerization concurs and, thereby, the degree of completion of polymerization is reduced contrarily. On the other hand, if the polymerization temperature is too low, the degree of completion of polymerization becomes insufficient, and a cross-linked copolymer, in which the content of the leachable compound is reduced, cannot be obtained. Therefore, the polymerization temperature between the monovinyl aromatic monomer and the cross-linkable aromatic monomer is adjusted appropriately within the range of room temperature (about 18° C. to 25° C.) or higher, preferably 40° C. or higher, and further preferably 70° C. or higher and usually 250° C. or lower, preferably 150° C. or lower, and further preferably 140° C. or lower.

[1-2-2] Addition of Oxygen-Degassed Monomer

An oxygen-degassed monomer refers to the monomer in which the oxygen concentration in the monomer is reduced to lower than the saturated oxygen concentration and performs a function of suppressing occurrences of lower-molecular-weight polymer components (dimers, trimers, and oligomers) which have been polymerized insufficiently, separable polymer components (linear polymers and polymer fine particles), byproducts of the polymerization reaction. For example, the saturated oxygen concentrations of usual styrene based monomers are about 5 percent by weight to 10 percent by weight. However, in the present invention, it is preferable that an oxygen-degassed monomer having the saturated oxygen concentration of less than 5 percent by weight, and in particular 3 percent by weight or less is used.

Examples of specific methods for preparing an oxygen-degassed monomer include a method in which a monomer is bubbled with an inert gas, a method in which film deaeration is conducted, a method in which an inert gas is passed through a gas phase portion on an upper surface in a monomer storage tank, and a method in which a treatment with a column of, for example, silica gel is conducted. Alternatively, a commercially available oxygen-degassed monomer can be used. Most of all, the method in which a monomer is bubbled with an inert gas is preferable. In this case, the inert gas used is preferably nitrogen, carbon dioxide, or argon. In this regard, the oxygen-degassed monomer is stored in an inert gas atmosphere.

The amount of addition of the oxygen-degassed monomer is usually 10 percent by weight or more, preferably 50 percent by weight or more, and further preferably 80 percent by weight or more. If the amount of addition of the oxygen-degassed monomer is too small, the amounts of occurrences of lower-molecular-weight polymer components (dimers, trimers, and oligomers) which have been polymerized insufficiently, separable polymer components (linear polymers and polymer fine particles), byproducts of the polymerization reaction, and the like increase.

[1-2-3] Use of Monomer from which Polymerization Inhibitor is Removed

The polymerization inhibitor in a mixture of the monovinyl aromatic monomer and the cross-linkable aromatic monomer used for the polymerization is removed and, thereby, occurrences of lower-molecular-weight polymer components (dimers, trimers, and oligomers) which have been polymerized insufficiently, separable polymer components (linear polymers and polymer fine particles), byproducts of the polymerization reaction, and the like can be suppressed, so that a cross-linked copolymer, in which the content of the leachable compound is reduced, can be obtained.

[1-2-4] Use of Cross-Linkable Aromatic Monomer Containing Reduced Impurities

In general, non-polymerizable impurities, e.g., diethylbenzene, are present in the cross-linkable aromatic monomer, e.g., divinylbenzene. Since these impurities become a cause of generation of the leachable compound (I), it is preferable that the cross-linkable aromatic monomer used for the polymerization has a small impurity content.

As for the cross-linkable aromatic monomer having a small impurity content, it is preferable that a specific grade having, for example, a cross-linkable aromatic monomer content (purity) of 57 percent by weight or more is selected and used. In addition, the cross-linkable aromatic monomer having a small impurity content can be obtained by removing impurities through, for example, distillation.

The cross-linkable aromatic monomer content (purity) of the cross-linkable aromatic monomer used in the present invention is particularly preferably 60 percent by weight or more, and further preferably 80 percent by weight or more. The non-polymerizable impurity content in the cross-linkable aromatic monomer is usually 5 percent by weight or less, preferably 3 percent by weight or less, and further preferably 1 percent by weight or less relative to the weight of the monomer. If this impurity content is too large, a chain transfer reaction relative to the impurities easily occurs during the polymerization. Therefore, the amount of leachable oligomers (polystyrenes) remaining in the polymer after completion of the polymerization may increase, so that a cross-linkable aromatic monomer having a small leachable compound content cannot be obtained.

[1-2-5] Adjustment of Usage of Cross-Linkable Aromatic Monomer

As described above, as the usage of the cross-linkable aromatic monomer subjected to the copolymerization increases, the oxidation resistance of the resin tends to be improved. If the degree of cross-linkage is too high, removal of leachable oligomers through extraction in a downstream operation tends to become insufficient, so that a cross-linked copolymer having a small leachable compound content is not obtained easily. Consequently, the usage of the cross-linkable aromatic monomer is adjusted appropriately within the range of 0.5 to 30 percent by weight, preferably 2.5 to 12 percent by weight, and further preferably 4 to 10 percent by weight relative to a total weight of monomers.

Furthermore, in the case where the step (1-b) is conducted after the above-described step (1-a), the following washing step can be adopted.

[1-2-6] Step to Wash Cross-Linked Copolymer

In the present invention, if necessary, the cross-linked copolymer produced from the monovinyl aromatic monomer and the cross-linkable aromatic monomer in the above-described step (1-a) is washed by using a solvent before the (1-c) haloalkylation step described later and, thereby, the above-described leachable compound (I) can be removed.

This washing method can be executed by a column system, in which the cross-linked copolymer is packed into a column and a solvent is passed, or a batch washing method.

The washing temperature is usually room temperature (20° C.) or higher, preferably 30° C. or higher, further preferably 50° C. or higher, and particularly preferably 90° C. or higher and usually 150° C. or lower, preferably 130° C. or lower, and further preferably 120° C. or lower. If the washing temperature is too high, decomposition of the cross-linked copolymer concurs. If the washing temperature is too low, a washing efficiency is reduced.

The contact time with the solvent is usually 5 minutes or more, preferably 1 hour or more, and further preferably 2 hours or more, and usually 4 hours or less. If the contact time with the solvent is too short, the washing efficiency is reduced, and if the time is too long, the productivity is reduced.

Examples of solvents used for washing include aliphatic hydrocarbons having the carbon number of 5 or more, e.g., pentane, hexane, and heptane; aromatic hydrocarbons, e.g., benzene, toluene, xylene, ethylbenzene, and diethylbenzene; alcohols, e.g., methanol, ethanol, propanol, and butanol; ketones, e.g., acetone and methyl ethyl ketone; ethers, e.g., dimethyl ether, diethyl ether, and methylal; chlorine based solvents, e.g., dichloromethane, chloroform, carbon tetrachloride, dichloroethane, and trichloroethane; and phenols, e.g., phenol. One type of them may be used alone, or at least two types may be used in combination. Among them, benzene, toluene, xylene, acetone, diethyl ether, methylal, dichloromethane, chloroform, dichloroethane, and trichloroethane are preferable. Furthermore, a method in which water is mixed to these solvents, the temperature is raised, and washing is conducted in an azeotropic state can also be adopted.

[1-3] (1-c) Step to Haloalkylate Cross-Linked Copolymer

The cross-linked copolymer obtained through the steps described in the chapters [1-1] and [1-2] is then haloalkylated in a swelled state by a reaction with a haloalkylation agent in the presence of a Friedel-Crafts reaction catalyst.

In order to swell the cross-linked copolymer, a swelling solvent, e.g., dichloroethane, can be used. However, in the present invention, it is preferable that swelling is conducted by the haloalkylation agent alone to sufficiently facilitate halomethylation.

Examples of Friedel-Crafts reaction catalysts include Lewis acid catalysts, e.g., zinc chloride, iron(III) chloride, tin(IV) chloride, and aluminum chloride. One type of these catalysts may be used alone, or at least two types may be used in combination.

In order to allow the haloalkylation agent to function as not only the reaction reagent, but also the swelling solvent of the copolymer, it is preferable that the agent having high affinity for the copolymer is used. Examples thereof include halogen compounds, e.g., chloromethyl methyl ether, methylene chloride, and bis(chloromethyl)ether, polyvinyl chloride, bis(chloromethyl)benzene. One type of them may be used alone, or at least two types may be used in combination. Chloromethyl methyl ether is more preferable. That is, the haloalkylation in the present invention is preferably chloromethylation.

Regarding the anion exchange resin according to the present invention, the haloalkyl group introduction ratio in the present step may be 80% or less, preferably 75% or less, and further preferably 70% or less relative to a theoretical halogen content where it is assumed that 100 percent by mole of the monovinyl aromatic monomer is haloalkylated. An increase of this haloalkyl group introduction ratio (percentage of the proportion of introduced halogen atoms relative to a theoretical halogen content where it is assumed that 100 percent by mole of the monovinyl aromatic monomer is haloalkylated) causes impurities because a main chain of a cross-linked copolymer is cut during introduction or excessively introduced haloalkyl groups are saparated after the introduction. However, in the case where the haloalkyl group introduction ratio is limited as described above, generation of impurities is suppressed and, thereby, an anion exchange resin having reduced leachables can be obtained.

It is believed that in the present invention, side reactions in the haloalkylation step are reduced by suppressing the amount of introduction of haloalkyl groups and, thereby, the leachable oligomer is not generated easily. Furthermore, it is believed that in generated byproducts, the amount of substances, which are not easily removed through washing in a downstream operation, is reduced than ever. As a result, an anion exchange resin having significantly reduced leachables can be obtained.

A specific method for introducing a haloalkyl group will be described below in detail.

The usage of the haloalkylation agent is selected within a wide range on the basis of the degree of cross-linkage of the cross-linked copolymer and other conditions. However, the amount is preferably at least the amount required for sufficiently swelling the cross-linked copolymer and is usually 1 time the cross-linked copolymer or more on a weight basis, preferably 2 times or more on a weight basis, and usually 50 times or less on a weight basis, and preferably 20 times or less on a weight basis.

Furthermore, the usage of the Friedel-Crafts reaction catalyst is usually 0.001 to 10 times the weight of the cross-linked copolymer, preferably 0.1 to 1 time, and further preferably 0.1 to 0.7 times.

Examples of means for specifying the ratio of introduction of haloalkyl groups into the cross-linked copolymer to be 80% or less include a means in which the reaction temperature is lowered, a means in which a catalyst having low activity is used, and a means in which the amount of addition of the catalyst is reduced. That is, examples of main factors which have effects on the reaction between the cross-linked copolymer and the haloalkylation agent include a reaction temperature, the activity (type) and the amount of addition of the Friedel-Crafts reaction catalyst, and the amounts of addition of the haloalkylation agent. Therefore, the haloalkyl group introduction ratio can be controlled by adjusting these conditions.

The reaction temperature is different depending on the type of the Friedel-Crafts reaction catalyst adopted. However, it is necessary that the reaction temperature is usually 0° C. or higher and is specified to be up to 55° C. at the maximum.

The preferable range of the reaction temperature is different depending on the haloalkylation agent and the Friedel-Crafts reaction catalyst used. For example, in the case where chloromethyl methyl ether is used as the haloalkylation agent and zinc chloride is used as the Friedel-Crafts reaction catalyst, the reaction temperature is usually 30° C. or higher, preferably 35° C. or higher, and usually 50° C. or lower, preferably 45° C. or lower. In this case, excessive introduction of the haloalkyl group can be suppressed by selecting the reaction time and the like appropriately.

Incidentally, in the haloalkyl group introduction reaction, a post-cross-linking reaction proceeds at the same time. Since the post-cross-linking reaction has significance in ensuring the strength of a final product, it is better that the time for the haloalkyl group introduction reaction is ensured to a certain extent. The reaction time of the haloalkylation is preferably 30 minutes or more, and further preferably 3 hours or more, and further preferably 5 hours or more. Moreover, the reaction time is preferably 24 hours or less, further preferably 12 hours or less, and further preferably 9 hours or less.

In addition, the above-described haloalkylation reaction may be conducted while the reaction temperature and/or the amount of catalyst is changed stepwise or continuously from the early reaction period toward the latter reaction period in the same reaction system.

[1-4] (1-d) Step to Remove Leachable Compound Having Specific Structure from Cross-Linked Copolymer Haloalkylated (Haloalkylated Cross-Linked Copolymer)

In the present invention, preferably, the haloalkylated cross-linked copolymer obtained as described in the chapter [1-3] is then refined by conducting a treatment to remove a leachable compound represented by the formula (II) described below (hereafter may be referred to as "leachable compound (II)") in such a way that the content of the above-described leachable compound (II) is specified to be preferably 400 μg or less, more preferably 100 μg or less, particularly preferably 50 μg or less, and especially preferably 30 μg or less relative to 1 g of the haloalkylated cross-linked copolymer. If the content of the leachable compound (II) is large, an anion exchange resin, in which remaining of impurities and generation of decomposition products are suppressed and leachables are reduced, cannot be obtained. It is preferable that the content of the leachable compound (II) is smaller, and the lower limit thereof is usually about 30 μg.

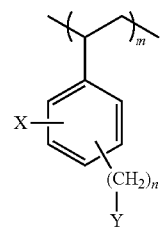

(II)

in the formula (II), X represents a hydrogen atom, a halogen atom, or an alkyl group which may be substituted by a halogen atom, Y represents a halogen atom, and m and n represent independently a natural number.

Here, the alkyl group which may be substituted by a halogen atom of X is usually an alkyl group having the carbon number of 1 to 10 or a haloalkyl group, preferably a methyl group, an ethyl group, a propyl group, a butyl group, a halomethyl group, a haloethyl group, a halopropyl group, or a halobutyl group, and further preferably a methyl group, an ethyl group, a halomethyl group, or a haloethyl group.

In addition, n is usually 1 or more, and usually 8 or less, preferably 4 or less, and further preferably 2 or less.

Incidentally, the above-described leachable compound (II) in the present invention becomes a cause of leachables of ion exchange resin at the time of a product similarly to the above-described leachable compound (I). The breakdown thereof include substances derived from leachable compounds inherently contained in the cross-linked copolymer serving as a base member of haloalkylation and substances generated at the stage of haloalkylation.

The substances derived from leachables compounds inherently contained in the cross-linked copolymer serving as a base member of haloalkylation are haloalkylated products of the leachable compound (I) described in the item [1-2] (1-b) and correspond to the substances represented by the above-described formula (II). In addition, substances in which a plurality of haloalkyl groups are introduced are also included.

Examples of the substances generated at the stage of haloalkylation include substances generated along with cleavage of carbon-carbon bonds through a reverse reaction of the Friedel-Crafts reaction, and they are also represented by the above-described formula (II). For example, low-molecular-weight and high-molecular-weight polymers and oligomer components generated along with cleavage of a main chain of the cross-linked copolymer are mentioned.

The weight average molecular weight of the leachable compound (II) in terms of polystyrene sulfonate is usually 200 or more, preferably 300 or more and usually 1,000,000 or less, preferably 100,000 or less. Regarding the leachable compound (II), in the case of a styrene based resin, examples of lower-molecular-weight polymer components which have been polymerized insufficiently include haloalkylated products of styrene dimers, styrene trimers, and styrene oligomers, and examples of separable polymer components include haloalkylated products of linear polystyrenes and polystyrene fine particles. Furthermore, examples of byproducts due to a chain transfer reaction in the polymerization reaction include haloalkylated products of lower-molecular-weight polymer components and separable polymer components, in which a polymerization inhibitor contained in a monomer is bonded.

The above-described leachable compound (II) can be removed by, for example, washing the haloalkylated cross-linked copolymer obtained in the step (1-c) with a solvent.

This washing method can be executed by a column system, in which the haloalkylated cross-linked copolymer is packed into a column and a solvent is passed, or a batch washing method.

The washing temperature is usually room temperature (20° C.) or higher, preferably 30° C. or higher, further preferably 50° C. or higher, and particularly preferably 90° C. or higher and usually 150° C. or lower, preferably 130° C. or lower, and further preferably 120° C. or lower. If the washing temperature is too high, decomposition of the polymer and fall-off of haloalkyl groups concur. If the washing temperature is too low, a washing efficiency is reduced.

The contact time with the solvent is usually 5 minutes or more, preferably more than or equal to the time in which the cross-linked copolymer swells by 80% or more, and usually 4 hours or less. If the contact time is too short, the washing efficiency is reduced, and if the time is too long, the productivity is reduced.

Examples of solvents used for washing include aliphatic hydrocarbons having the carbon number of 5 or more, e.g., pentane, hexane, and heptane; aromatic hydrocarbons, e.g., benzene, toluene, xylene, ethylbenzene, and diethylbenzene; alcohols, e.g., methanol, ethanol, propanol, and butanol; ketones, e.g., acetone and methyl ethyl ketone; ethers, e.g., dimethyl ether, diethyl ether, and methylal; chlorine based solvents, e.g., dichloromethane, chloroform, carbon tetrachloride, dichloroethane, and trichloroethane; and phenols, e.g., phenol. One type of them may be used alone, or at least two types may be used in combination. Among them, benzene, toluene, xylene, acetone, diethyl ether, methylal, dichloromethane, chloroform, dichloroethane, and trichloroethane are preferable.

[1-5] (1-e) Step to Subject Haloalkylated Cross-Linked Copolymer to Reaction with Amine Compound Regarding the anion exchange resin according to the present invention, the haloalkylated cross-linked copolymer, from which the leachable compound (II) have been removed as described above, is subjected to a reaction with an amine compound and, thereby, amino groups are introduced, so that the anion exchange resin is produced. The introduction of the amino group can be conducted easily on the basis of the publicly known technology.

Examples thereof include a method in which the haloalkylated cross-linked copolymer is suspended in a solvent and is subjected to a reaction with trimethyl amine or dimethyl ethanol amine.

As for the solvent used in this introduction reaction, for example, water, toluene, dioxane, dimethylformamide, dichloroethane, and the like are used alone or in combination.

Thereafter, the salt type is changed to various anion types by the publicly known methods, so that the anion exchange resin is obtained.

As described above, in the case where the haloalkyl group introduction ratio is controlled by suppressing the reaction condition in the haloalkylation step, the manner of cross-linkage in the post-cross-linking may become weak. As for a measure in this case, in the above-described step (1-a), the cross-linked copolymer is synthesized while the amount of addition of the cross-linkable aromatic monomer is made larger than the amount required for obtaining a resin having a desired water content in the conventional method for manufacturing an anion exchange resin in advance and, thereafter, the haloalkylation condition according to the present invention is employed, so that it becomes possible to control the haloalkyl group introduction ratio at 80% or less.

In the case where the cross-linkage density of the haloalkylated cross-linked copolymer is controlled by adding the above-described operation and, subsequently, the amine is subjected to a reaction to produce the anion exchange resin, a desired water content and strength can be ensured.

[1-6] Method for Manufacturing OH Type Anion Exchange Resin

An OH type anion exchange resin according to the present invention can be produced by regenerating the Cl type anion exchange resin, which is synthesized as described above, by a publicly known regeneration method for facilitating conversion to the OH type.

As for this regeneration method, for example, a method described in Japanese Unexamined Patent Application Publication No. 2002-102719 can be used favorably.

[1-7] Method for Refining OH Type Anion Exchange Resin

Regarding the OH type anion exchange resin according to the present invention, the Cl type or the OH type anion exchange resin is produced by the method up to the item [1-5] or [1-6] and, thereafter, a publicly known leachable reduction method is applied, so that an anion exchange resin for ultrapure water can be produced.

As for this refining method, a method described in Japanese Unexamined Patent Application Publication No. 2002-102719 can be used favorably.

Specifically, a method in which the anion exchange resin is heated and washed in the presence of an alkaline solution, a method in which hot water washing is conducted with a column, and a method in which washing is conducted with a solvent are used favorably. Furthermore, the Cl type or the OH type anion exchange resin is produced by the method up to the item [1-5] or [1-6] and, thereafter, a publicly known metal content reduction method may be applied to the resulting anion exchange resin, as necessary.

[1-8] Other Treatments

The thus obtained anion exchange resin according to the present invention may be further subjected to various treatments which are usually conducted for treating the anion exchange resins. For example, an agglomeration (clumping) prevention treatment may be conducted by a publicly known method.

That is, in general, in the case where the anion exchange resin and the cation exchange resin are used in the mixed bed, the volume of the mixed bed resin formed from the cation exchange resin and the anion exchange resin increases excessively because of an "agglomeration (clumping) phenomenon" in which the anion exchange resin is electrically entangled with the cation exchange resin, so as to cause a handling problem.

Therefore, it is favorable that an agglomeration (clumping) prevention treatment is applied to the anion exchange resin according to the present invention and, thereby, the volume increase ratio in the case where mixing with a cation exchange resin is conducted is specified to be 150% or less, preferably 130% or less, and further preferably 110% or less relative to the volume before mixing. In this regard, the volume increase ratio refers to a proportion of the volume of a mixed bed resin after mixing the anion exchange resin and the cation exchange resin relative to a total of the volumes of the individual resins before mixing on a percentage basis.

As for this agglomeration (clumping) prevention treatment, publicly known methods described in Japanese Unexamined Patent Application Publication No. 10-202118 and Japanese Unexamined Patent Application Publication No. 2002-102719 can be applied.

Specifically, the agglomeration (clumping) prevention treatment can be conducted through treatment with a water-soluble polymer containing usually 0.01 mmol/L or more, preferably 0.1 mmol/L or more, and usually 10 mmol/L or less, preferably 2 mmol/L or less of anionic dissociative group relative to 1 liter of the anion exchange resin.

Examples of water-soluble polymers containing the anionic dissociative group suitable for use in the present invention include publicly known water-soluble polymers described in Japanese Unexamined Patent Application Publication No. 10-202118 and Japanese Unexamined Patent Application Publication No. 2002-102719. Preferable examples include polystyrene sulfonate, polyvinylbenzyl sulfonate, polymaleic acid, poly(meth)acrylate, and polyvinyl sulfonate. Among them, it is preferable to use polystyrene sulfonate and polyvinyl sulfonate. One type of them may be used alone, or at least two types may be used in combination.

[2] Method for Manufacturing Anion Exchange Resin Through Contact with Water-Soluble Polymer A method for manufacturing an anion exchange resin according to a second aspect of the present invention is characterized in that a water-soluble polymer containing an anionic dissociative group is allowed to contact the anion exchange resin and, thereby, an anion exchange resin having a wafer surface flatness of 4 Å or less in terms of Rms based on the following item (B) Silicon wafer test is produced.

(B) Silicon Wafer Test

The surface flatness (Rms) is a value measured through operations described in the following items (1) to (4).
(1) After 500 mL of anion exchange resin is filled into a column having a diameter of 40 mm and a length of 500 mm, ultrapure water having a resistivity of 18.2 MΩ·cm or more, a water temperature of 25° C., and a TOC of 0.5 μg/L is passed at SV of 60 hr$^{-1}$ under a room temperature condition.
(2) After the water is passed for 3 hours, the water is allowed to contact and pass a bare silicon wafer for 1 hour. As for a wafer holder used at that time, a container which can hold one wafer in the inside, which is not influenced by the outside air, and which can examine only the influence of contact of the ultrapure water on the wafer is used (for example, the holder disclosed in Japanese Unexamined Patent Application Publication No. 2001-208748).
(3) After the water is passed through the bare silicon wafer for 1 hour, the wafer is taken out of the holder in a clean room, and the wafer is dried through spin drying.
(4) After the drying, the silicon wafer surface flatness is measured with an atomic force microscope (AFM).

In the case where the wafer surface flatness based on the above-described silicon wafer test exceeds 4 Å in terms of Rms, the amount of leachables is large and the silicon wafer surface is affected. It is preferable that the surface flatness is smaller. The surface flatness is more preferably 3 Å or less in terms of Rms, and particularly preferably 2.5 Å or less in terms of Rms. The lower limit of the wafer surface flatness is not specifically limited, but the wafer surface flatness is usually 1 Å or more.

As for the water-soluble polymer containing an anionic dissociative group (hereafter may be referred to as "anionic water-soluble polymer") used for the treatment of the anion exchange resin, for example, publicly known anionic water-soluble polymers described in Japanese Unexamined Patent Application Publication No. 10-202118 and Japanese Unexamined Patent Application Publication No. 2002-102719 can be used.

The anionic water-soluble polymer used for the treatment of the anion exchange resin is not specifically limited. However, linear polymer materials and the like, which have many acid groups, e.g., carboxylic groups and sulfonic groups, in the molecule are used preferably. Specific examples usually include polystyrene sulfonates, polyacrylates, polymethyl methacrylates, polymaleic acids, and copolymers obtained from at least two types of monomers constituting the above-described polymers. Each polymer may be in the form of a salt. Among them, polystyrene sulfonates are preferable. Examples of counter ions of functional groups usually include $H^+$, $Na^+$, and $NH_4^+$. Among them, $H^+$ is preferable.

As for the molecular weight of the above-described anionic water-soluble polymer, the weight average molecular weight is 500 to 2,000,000, and preferably 5,000 to 500,000. If this molecular weight is small, a sufficient agglomeration (clumping) prevention effect is not easily exerted, and if the molecular weight is too large, the operability and the solubility of the water-soluble polymer tend to become poor.

The proportion of adhesion (amount of contact) of the above-described water-soluble polymer is usually 0.01 mmol/L or more, preferably 0.1 mmol/L or more, and usually 10 mmol/L or less, preferably 2 mmol/L or less relative to 1 liter of the anion exchange resin. If this amount is less than 0.01 mmol/L, a sufficient treatment effect is not obtained, and if the amount exceeds 10 mmol/L, an adverse effect is exerted, so that the demineralizing performance of the anion exchange resin deteriorates.

A method for treating the anion exchange resin with the anionic water-soluble polymer will be described.

Any treatment method may be employed insofar as the method adheres the anionic water-soluble polymer without breaking the anion exchange resin. However, a method in which the anionic water-soluble polymer is adhered to the anion exchange resin in the presence of water is used favorably. Specific examples include a method in which an aqueous solution of the anionic water-soluble polymer is sprayed and adhered to the anion exchange resin, a method in which the anion exchange resin is mixed into an aqueous solution of the anionic water-soluble polymer so as to facilitate adhesion, a method in which an anionic water-soluble polymer electrolyte is mixed into an aqueous solution of the anion exchange resin so as to facilitate adhesion, and a method in which an aqueous solution of the anionic water-soluble polymer is injected into a slurry-like anion exchange resin in the state of being fluidized through bubbling or the like, so as to facilitate adhesion. The treatment time is specified to be within the range of usually 10 minutes to 3 hours, and preferably 30 minutes to 1 hour. Here, adhesion of the anionic water-soluble polymer may be any one of partial adhesion and entire adhesion, although the entire adhesion is preferable.

The anion exchange resin after being treated with the anionic water-soluble polymer is washed with an alcohol based solvent or a water-soluble solvent, e.g., methanol, ethanol, propanol, or methylal, and thereafter, washing with ultrapure water is conducted. Subsequently, the anion exchange resin is used.

The shape of the anion exchange resin, to which the above-described treatment with the anionic water-soluble polymer according to the present invention is applied, is not specifically limited. The treatment can be effectively applied to the anion exchange resins having various shapes, e.g., the shape of a fiber, a powder, a plate, or a film, besides the shape of beads which is employed in general.

Furthermore, the present invention can be applied to a treatment of the Cl type anion exchange resin before regeneration and can also be applied to the anion exchange resin which has been converted to the OH type through regeneration by a publicly known regeneration method. For example, the method described in Japanese Unexamined Patent Application Publication No. 2002-102719 can be used favorably.

Moreover, the present invention can also be applied to the anion exchange resin for ultrapure water subjected to a publicly known leachable reduction method. For example, the anion exchange resin treated by the method described in Japanese Unexamined Patent Application Publication No. 2002-102719 can be used favorably. Specifically, the anion exchange resins refined by a method in which heating and washing are conducted in the presence of an alkaline solution, a method in which hot water washing is conducted with a column, and a method in which washing is conducted with a solvent can be applied favorably. In addition, it is possible to apply to the anion exchange resin treated by a publicly known metal content reduction method, as necessary.

The present invention can be applied favorably to an anion exchange resin having a uniform particle diameter.

Furthermore, it is possible to apply to not only a type I anion exchange resin, but also a type II anion exchange resin favorably.

[3] Properties and Characteristics of Anion Exchange Resin

The anion exchange resin according to the present invention has the properties and the characteristics described below and is produced preferably by the above-described item [1] Method for manufacturing anion exchange resin or item [2] Method for manufacturing anion exchange resin through contact with water-soluble polymer. However the manufacturing method is not specifically limited.

The shape and the structure of the anion exchange resin according to the present invention are not specifically limited. Examples of shapes include various shapes, e.g., the shape of a fiber, a powder, a plate, and a film, besides the shape of beads which is used in general.

Moreover, the water content of the anion exchange resin according to the present invention is usually 25 percent by weight or more, and 75 percent by weight or less. However, in practice, it is preferable that the water content is specified to be within the range of 30 percent by weight or more, and 60 percent by weight or less.

[3-1] Water Content and Exchange Capacity
[3-1-1] Water Content and Exchange Capacity Per Unit Volume Measured on a Cl Type Basis Regarding the anion exchange resin according to the present invention or the anion exchange resin according to a preferred embodiment of the present invention, the water content $W_{Cl}$ (percent by weight) and the exchange capacity $Q_{Cl}$ per unit volume (meq/mL-resin) measured on a Cl type basis satisfy any one of the following formulae (1) to (5).

$$Q_{Cl} \le 1.25 \text{ (where } W_{Cl} < 38) \tag{1}$$

$$Q_{Cl} \le 1.36 \text{ (where } 38 \le W_{Cl} < 42) \tag{2}$$

$$Q_{Cl} \le 1.2 \text{ (where } 42 \le W_{Cl} < 48) \tag{3}$$

$$Q_{Cl} \le 1.1 \text{ (where } 48 \le W_{Cl} < 55) \tag{4}$$

$$Q_{Cl} \le 0.8 \text{ (where } 55 \le W_{Cl}) \tag{5}$$

The water content $W_{Cl}$ (percent by weight) and the exchange capacity $Q_{Cl}$ per unit volume (meq/mL-resin) of this anion exchange resin preferably satisfy any one of the following formulae (1') to (5').

$$Q_{Cl} \le 1.23 \text{ (where } W_{Cl} < 38) \tag{1'}$$

$$Q_{Cl} \le 1.36 \text{ (where } 38 \le W_{Cl} < 42) \tag{2'}$$

$$Q_{Cl} \le 1.2 \text{ (where } 42 \le W_{Cl} < 48) \tag{3'}$$

$$Q_{Cl} \le 1.1 \text{ (where } 48 \le W_{Cl} < 55) \tag{4'}$$

$$Q_{Cl} \le 0.8 \text{ (where } 55 \le W_{Cl}) \tag{5'}$$

Alternatively, regarding the anion exchange resin according to the present invention or the anion exchange resin according to preferred embodiment of the present invention, the water content $W_{Cl}$ (percent by weight) and the exchange capacity $Q_{Cl}$ per unit volume (meq/mL-resin) measured on a Cl type basis satisfy the following formula (8).

$$Q_{Cl} \le -0.021 W_{Cl} + 2.28 \tag{8}$$

As described above, a common anion exchange resin tends to have a large water content and a large exchange capacity.

The Cl type anion exchange resin according to the present invention or the Cl type anion exchange resin according to preferred embodiment of the present invention is characterized in that the exchange capacity is small as compared with that of the conventional anion exchange resin having nearly the same water content, as is specified by the above-described formulae (1) to (5), preferably (1') to (5'), or the above-described formula (8).

The reason the Cl type anion exchange resin having the exchange capacity smaller than that of the conventional anion exchange resin having nearly the same water content prevents remaining of impurities and generation of decomposition products and suppresses an occurrence of an eluate during the use as compared with the conventional resin, as described above, is estimated as the following.

(i) Reduction of Impurities with Multiple Functional Groups

In the haloalkylation reaction, introduction of a plurality of haloalkyl groups into one monomer unit of a cross-linked copolymer is also effected. If such impurities are present, the solubility in an organic solvent is low and, thereby, a heavy load is required for removal with the organic solvent. Furthermore, steric hindrance in amination is significant and, thereby, all of a plurality of haloalkyl groups may not be aminated and some of them may be left. As a result, it is estimated that impurities exhibiting low water washability (hereafter referred to as "impurities with multiple functional groups") remain in a final product so as to cause an occurrence of a leachable during the use.

On the other hand, it is believed that the anion exchange resin according to the present invention has no excess exchange group as compared with the conventional resin and, therefore, the amount of impurities with multiple functional groups is reduced correspondingly.

(ii) Reduction in Amount of Leachables Through Reduction in Exchange Group Itself Amines, e.g., trimethylamine, are known as one type of leachables from the anion exchange resin. It is believed that the cause of the leachable of amines is fall-off of the exchange group.

On the other hand, it is believed that the amount of exchange groups of the anion exchange resin according to the present invention is smaller than that of the conventional resin and, therefore, leachables resulting from fall-off of the exchange group is reduced.

(iii) Suppression of Exchange Group Fall-Off Through Selective Haloalkylation

In sometimes, usual anion exchange resin has a plurality of exchange groups relative to one monomer unit and it is believed that fall-off of exchange group easily occurs because of steric hindrance resulting therefrom. Therefore, in order to suppress fall-off of such an exchange group, it is recommended that one exchange group is included in one monomer unit.

In this regard, the anion exchange resin according to the present invention has a small exchange capacity as compared with that of the conventional resin and, therefore, there are not many cases where one monomer unit has a plurality of exchange groups. Consequently, it is believed that steric hindrance between exchange groups is reduced and, thereby, fall-off of the exchange group is reduced and leachables resulting from fall-off of the exchange group is reduced during the use.

(iv) Suppression of Carbon-Carbon Bond Cleavage in Haloalkylation

In the haloalkylation step, usually, a Lewis acid is added and the Friedel-Crafts reaction (generation of carbon-carbon bond) is effected. In this reaction, cleavage of carbon-carbon bond is also effected due to a reverse reaction. Consequently, cleavage of the main chain of the cross-linked copolymer concurs and leachables of low-molecular-weight oligomers and high-molecular-weight linear polymers are generated.

On the other hand, it is believed that regarding the anion exchange resin having small amount of exchange groups according to the present invention, such cleavage of carbon-carbon bond and cleavage of the main chain are reduced and, thereby, leachables are reduced.

Incidentally, the exchange capacity $Q_{Cl}$ and the water content $W_{Cl}$ of the Cl type anion exchange resin according to the present invention are analyzed and measured by the following methods.

[Methods for Measuring Exchange Capacity $Q_{Cl}$ and Water Content $W_{Cl}$]

The anion exchange resin is packed into a column and 5 percent by weight NaCl aqueous solution in an amount 25 times the volume of the resin is passed therethrough, so as to convert the anion type to the Cl type. This resin is taken by 10 ml and is packed into a column. The anion type is converted to the OH type by passing 2-N NaOH aqueous solution in an amount 75 times the amount of the resin. Washing with demineralized water is conducted sufficiently until the washing filtrate becomes neutral. Thereafter, 5 percent by weight NaCl aqueous solution in an amount 25 times the amount of the resin is passed and an effluent is collected entirely. The resulting effluent is titrated with hydrochloric acid and, thereby, the exchange capacity $Q_{Cl}$ (meq/mL-resin) is calculated.

Furthermore, the resin, in which the anion type has been converted to the Cl type, is subjected to centrifugal separation to remove adhered water and, then, the weight is measured. Thereafter, drying is conducted in a constant-temperature dryer at 105±2° C. for about 4 hours. After standing in a desiccator to cool, the weight is measured, and the water content $W_{Cl}$ (percent by weight) is calculated.

Regarding the anion exchange resin according to the present invention, examples of methods for allowing the exchange capacity $Q_{Cl}$ and the water content $W_{Cl}$ to satisfy the above-described formulae (1) to (5), preferably (1') to (5'), or the above-described formula (8) include, in the case of, for example, the anion exchange resin obtained by haloalkylating the cross-linked copolymer produced by co-polymerizing the monovinyl aromatic monomer and the cross-linkable aromatic monomer and effecting a reaction with an amine compound, (a) a method in which the haloalkyl group introduction ratio at the stage of haloalkylation is reduced than ever, (b) a method in which the stage of haloalkylation is conducted under a suppressed reaction condition, for example, a reaction condition in which the amount of catalyst is reduced, the amount of reaction solvent is increased, or the catalyst concentration is reduced, and (c) a method in which at the stage of the cross-linked copolymer of the monovinyl aromatic monomer and the cross-linkable aromatic monomer, the content of a specific leachable compound is controlled at a certain value or lower.

[3-1-2] Water Content and Exchange Capacity Per Unit Volume Measured on an OH Type Basis Regarding the anion exchange resin according to the present invention or the anion exchange resin according to a preferred embodiment of the present invention, the water content $W_{OH}$ (percent by weight) and the exchange capacity $Q_{OH}$ per unit volume (meq/mL-resin) measured on an OH type basis satisfy the following formula (6) or (7).

$$Q_{OH} \leq 1.1 \text{(where } W_{OH} < 66) \quad (6)$$

$$Q_{OH} \leq 0.9 \text{(where } 66 \leq W_{OH}) \quad (7)$$

Alternatively, regarding the anion exchange resin according to the present invention or the anion exchange resin according to a preferred embodiment of the present invention, the water content $W_{OH}$ (percent by weight) and the exchange capacity $Q_{OH}$ per unit volume (meq/mL-resin) measured on an OH type basis satisfy the following formula (9).

$$Q_{OH} \leq -0.018 W_{OH} + 2.05 \quad (9)$$

As described above, the conventional anion exchange resin or the OH type anion exchange resin according to a preferred embodiment of the present invention tends to have a large water content and a large exchange capacity.

The OH type anion exchange resin according to the present invention is characterized in that the exchange capacity is small as compared with that of the conventional anion exchange resin having nearly the same water content, as is specified by the above-described formula (6) or (7) or the above-described formula (9).

The reason the OH type anion exchange resin having the exchange capacity smaller than that of the conventional anion exchange resin having nearly the same water content prevents remaining of impurities and generation of decomposition products and suppresses an occurrence of a leachable during the use as compared with the conventional resin, as described above, is the same as those described in the explanation of the Cl type anion exchange resin according to the present invention.

Incidentally, the exchange capacity $Q_{OH}$ and the water content $W_{OH}$ of the OH type anion exchange resin according to the present invention are analyzed and measured by the following methods.

[Methods for Measuring Exchange Capacity $Q_{OH}$ and Water Content $W_{OH}$]

The OH type anion exchange resin is taken by 10 ml and is packed into a column. Thereafter, 5 percent by weight NaCl aqueous solution in an amount 25 times the amount of the resin is passed and an effluent is collected entirely. The resulting effluent is titrated with hydrochloric acid and, thereby, the exchange capacity $Q_{OH}$ (meq/mL-resin) is calculated.

Furthermore, the OH type anion exchange resin is subjected to centrifugal separation to remove adhered water. Thereafter, the water content $W_{OH}$ is measured by a Karl Fischer's method through the use of a digital automatic titration apparatus (for example, an apparatus corresponding to "Karl Fischer Model KF07" produced by MITSUBISHI CHEMICAL CORPORATION), following the procedure described below.

About 5 g of sample is weighed accurately into a 20-mL weighing bottle. About 0.1 g of sample is taken from the bottle with a spoon promptly and is put into about 30 mL of methanol adjusted to have a water content of "0" on a Karl Fischer's reagent basis. Subsequently, the Karl Fischer's reagent is dropped while agitation is conducted. After the last one drop is added, the point in time when the reading of an ammeter remains unchanged for 30 seconds is assumed to be an end point, and the water content $W_{OH}$ (percent by weight) is calculated.

Regarding the OH type anion exchange resin according to the present invention, methods for allowing the exchange capacity $Q_{OH}$ and the water content $W_{OH}$ to satisfy the above-described formulae (6) or (7) or the above-described formula (9) are the same as the methods for allowing the exchange capacity $Q_{Cl}$ and the water content $W_{Cl}$ of the Cl type anion exchange resin according to the present invention to satisfy the above-described formulae (1) to (5), preferably (1') to (5'), or the above-described formula (8).

[3-2] ΔTOC Based on Ultrapure Water Flow Test

Regarding the anion exchange resin according to the present invention, the ΔTOC based on the following item (A) Ultrapure water flow test is preferably 0.5 ppb or less, and further preferably 0.2 ppb or less.

(A) Ultrapure Water Flow Test (1) Ultrapure water having a resistivity of 18 MΩ·cm or more and a water temperature of 20° C. to 40° C. is filled into an empty measurement column having a diameter of 30 mm and a length of 1,000 mm under a room temperature condition, the ultrapure water is passed at SV of 30 hr$^{-1}$, and the TOC concentration (TOC$_0$) of the water at the measurement column outlet is measured.

(2) After 500 mL of the above-described anion exchange resin is poured and filled into the above-described measurement column, the above-described ultrapure water is passed through the column at SV of 30 hr$^{-1}$ under a room temperature condition, and the TOC concentration (TOC$_1$) of the water at the measurement column outlet is measured after 20 hours.

(3) The ΔTOC is calculated by the following formula.

$$\Delta TOC(ppb) = TOC_1 - TOC_0$$

As for measuring apparatuses of the resistivity and the TOC concentration in the above-described item (A) Ultrapure water flow test, commercially available measuring apparatuses are used within the bound of not impairing the technical significance of the present invention. In the case of an anion exchange resin used for production of electronic component•material washing ultrapure water, highly accurate measuring apparatuses are desirable.

Examples of the resistivity measuring instruments can include "AQ-11" produced by DKK Corporation. Furthermore, examples of TOC measuring instruments can include "Model A-1000XP", "Model A-1000", "A-100SE", and "S20P" produced by Anatel Corp., and "Model 500RL" produced by Sievers.

In the case where the ΔTOC based on the above-described item (A) Ultrapure water flow test exceeds 0.5 ppb, the anion exchange resin is not favorable as an anion exchange resin for production of ultrapure water, in particular ultrapure water for washing electronic component•material, e.g., semiconductors, because there is a purity deterioration problem due to leachables.

[3-3] Volume Increase Ratio

It is favorable that in the case where the anion exchange resin according to the present invention is mixed with the cation exchange resin, the volume increase ratio is specified to be 150% or less relative to the volume before mixing, preferably 130% or less, and further preferably 10% or less by conducting the agglomeration (clumping) prevention treatment, as described above. If this volume increase ratio is too large, the volume of the mixed bed resin formed from the anion exchange resin and the cation exchange resin increases excessively and, thereby, a problem occurs in handling.

Therefore, it is favorable that the above-described agglomeration (clumping) prevention treatment is applied, as necessary, in such a way that the above-described volume increase ratio is ensured.

In this regard, the volume increase ratio of the anion exchange resin is measured by the following method.

<Method for Measuring Volume Increase Ratio>

1) An anion exchange resin in the state of slurry in water is measured by 1 part and is put into a measuring cylinder.

2) A cation exchange resin in the state of slurry in water is measured by 1 part and is put into a measuring cylinder.

3) The cation exchange resin is poured into the anion exchange resin, shaking in the vertical direction is conducted 10 times, and the volume of the resulting mixed bed resin is measured.

4) The volume increase ratio is determined from the following formula.

$$\text{(volume increase ratio) \%} = \text{(mixed bed resin volume)}/\text{(anion exchange resin volume} + \text{cation exchange resin volume)} \times 100$$

[3-4] Crush Strength

It is preferable that the anion exchange resin has the crush strength per particle of 7.5 N or more, preferably 9 N or more, and further preferably 10 N or more, and usually 50 N or less, and preferably 30 N or less.

Regarding the anion exchange resin according to the present invention having high crush strength as compared with that of the usual anion exchange resin, as described above, leachables are reduced.

The reason the anion exchange resin having high crush strength includes reduced leachables is estimated as described below.

A cross-linked copolymer of styrene and divinylbenzene, which is an example of an anion exchange resin (that is, a cross-linked copolymer of a monovinyl aromatic monomer and a cross-linkable aromatic monomer) having no exchange group, is a hard particle usually exhibiting 20 N or more, and the ΔTOC is nearly zero because a water-soluble leachable is not contained at all.

Therefore, in the case of the anion exchange resin having an exchange capacity lower than that of the conventional resin, as in the present invention, it is believed that the crush strength is high and the ΔTOC based on the above-described item (A) Ultrapure water flow test is low.

In this regard, the crush strength of the anion exchange resin in the present invention is measured as described below.

<Method for Measuring Crush Strength>

(1) Several hundred spherical anion exchange resins, which pass a 850-μm sieve and which remain on a 600-μm sieve, are taken and stored in demineralized water until measurement.

(2) At least 60 samples are selected randomly, and the strength is measured with the Chatillon tester or an equivalent thereof.

(3) An average value of strengths of all particles is calculated.

[3-5] Wafer Surface Flatness

Regarding the anion exchange resin according to the present invention, it is preferable that the wafer surface flatness determined by the following item (B) Silicon wafer test is 4 Å or less in terms of Rms, in particular 3 Å or less in terms of Rms, and especially 2.5 Å or less in terms of Rms.

(B) Silicon Wafer Test

The surface flatness (Rms) is a value measured through operations described in the following items (1) to (4).

(1) After 500 mL of anion exchange resin is filled into a column having a diameter of 40 mm and a length of 500 mm, ultrapure water having a resistivity of 18.2 MΩ·cm or more, a water temperature of 25° C., and a TOC of 0.5 μg/L is passed at SV of 60 hr$^{-1}$ under a room temperature condition.

(2) After the water is passed for 3 hours, the water is allowed to contact and pass a bare silicon wafer for 1 hour. As for a wafer holder used at that time, a container which can hold one wafer in the inside, which is not influenced by the outside air, and which can examine only the influence of contact of the ultrapure water on the wafer is used (for example, the holder disclosed in Japanese Unexamined Patent Application Publication No. 2001-208748).

(3) After the water is passed through the bare silicon wafer for 1 hour, the wafer is taken out of the holder in a clean room, and the wafer is dried through spin drying.

(4) After the drying, the silicon wafer surface flatness is measured with an atomic force microscope (AFM).

In the case where the wafer surface flatness based on the above-described item (B) Silicon wafer test is too large, the amount of leachables from the anion exchange resin is large and the silicon wafer surface is affected. It is preferable that the wafer surface flatness is smaller. The lower limit of the wafer surface flatness is not specifically limited, but the wafer surface flatness is usually 1 Å or more.

[4] Method for Manufacturing Cation Exchange Resin

A method for manufacturing a cation exchange resin according to the present invention includes the following steps of (2-a) to (2-c), and preferably further includes the step of (2-d).

(2-a) A step to obtain a cross-linked copolymer by copolymerizing a monovinyl aromatic monomer and a cross-linkable aromatic monomer.

(2-b) A step to specify the content of the leachable compound represented by the following formula (I) to be 400 μg or less relative to 1 g of the cross-linked copolymer of the monovinyl aromatic monomer and the cross-linkable aromatic monomer.

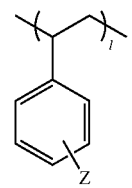

(I)

in the formula (I), Z represents a hydrogen atom or an alkyl group, and l represents a natural number.

(2-c) A step to sulfonate the cross-linked copolymer having a content of the above-described leachable compound of 400 μg or less relative to 1 g of the cross-linked copolymer.

(2-d) A step to remove the leachable compound represented by the following formula (III) from the sulfonated cross-linked copolymer.

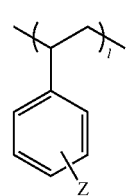

(III)

in the formula (III), X represents a hydrogen atom, a halogen atom, or an alkyl group which may be substituted by a halogen atom, M represents a hydrogen atom, a metal atom, or a quaternary ammonium group, and p represents a natural number.

[4-1] (2-a) Step to Obtain Cross-Linked Copolymer by Copolymerizing Monovinyl Aromatic Monomer and Cross-Linkable Aromatic Monomer In the present step, the same method as that in the step to obtain the cross-linked copolymer of the anion exchange resin in the chapter [1-1] described above can be adopted. The types of the monovinyl aromatic monomer and the cross-linkable aromatic monomer used and a method and a condition of the polymerization reaction, and the like are the same as those described above in the chapter [1-1].

In this regard, the usage of the cross-linkable aromatic monomer is usually 0.5 to 30 percent by weight relative to a total weight of monomers, preferably 2.5 to 18 percent by weight, and further preferably 7 to 14 percent by weight. As the usage of the cross-linkable aromatic monomer increases and the degree of cross-linkage becomes higher, the oxidation resistance of the resulting cation exchange resin tends to be improved. On the other hand, if the degree of cross-linkage is too high, removal of leachable oligomers through water washing in a downstream operation tends to become insufficient. In this regard, in the case of a cation exchange resin having a high degree of cross-linkage, during the use as a cation exchange resin for application to ultrapure water, the velocity of reaction with impurities (metal ions and colloidal substances, amines and ammonium salts) in the original water to be refined is reduced and the ion exchange efficiency is reduced, so that the purity of the treated water tends to deteriorate.

[4-2] (2-b) Step to Specify Content of Leachable Compound Having Specific Structure to be 400 μg or Less Relative to 1 g of Cross-Linked Copolymer The method for manufacturing a cation exchange resin according to the present invention includes the step to specify the content of the leachable compound represented by the following formula (I) (hereafter may be referred to as "leachable compound (I)") to be 400 μg or less relative to 1 g of the cross-linked copolymer, preferably 300 μg or less, and more preferably 200 μg or less before the cross-linked copolymer obtained in the chapter [4-1] is sulfonated.

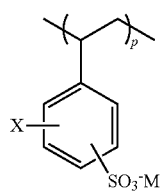

(I)

in the formula (I), Z represents a hydrogen atom or an alkyl group, and l represents a natural number.

Here, the alkyl group of Z is usually an alkyl group having the carbon number of 1 to 8, preferably a methyl group, an ethyl group, a propyl group, and a butyl group, and further preferably a methyl group and an ethyl group.

If the content of the above-described leachable compound (I) in the cross-linked copolymer to be subjected to sulfonation exceeds 400 μg, a cation exchange resin, in which remaining of impurities and generation of decomposition products are suppressed and leachables are reduced, cannot be obtained. It is preferable that the content of the leachable compound (I) is smaller, and the lower limit thereof is usually about 50 μg.

This leachable compound (I) is the same as the leachable compound (I) of the anion exchange resin in the above-described chapter [1-2]. Furthermore, the present step can be conducted by adopting the same method as that in the step to reduce the leachable compound (I) of the anion exchange resin in the above-described chapter [1-2].

That is, this step (2-b) is conducted at the same time with the step (2-a) by adjusting, in particular, the polymerization condition in the above-described step (2-a). Moreover, after the polymerization, the resulting cross-linked copolymer is washed to remove the leachable compound (I) and, thereby, a cross-linked copolymer, in which the content of leachable compound is reduced, can be obtained.

In the case where a cross-linked copolymer, in which the content of leachable compound is reduced, is obtained by adjusting the polymerization condition in the above-described step (2-a), examples of methods for adjusting such a polymerization condition include the following, as in the above-described chapter [1-2]. The individual methods can be conducted in a manner similar to the above-described respective methods.

[4-2-1] Adjustment of Polymerization Temperature
[4-2-2] Addition of Oxygen-Degassed Monomer
[4-2-3] Use of Monomer from which Polymerization Inhibitor is Removed
[4-2-4] Use of Cross-Linkable Aromatic Monomer Containing Reduced Impurities
[4-2-5] Adjustment of Usage of Cross-Linkable Aromatic Monomer In this regard, in the item [4-2-5] Adjustment of usage of cross-linkable aromatic monomer, as the usage of the cross-linkable aromatic monomer subjected to the copolymerization increases, the oxidation resistance of the resin tends to be improved, as described above. If the degree of cross-linkage is too high, removal of leachable oligomers through water washing in a downstream operation becomes insufficient easily, so that a cross-linked copolymer having a small content of the leachable compound is not obtained easily. Consequently, the usage of the cross-linkable aromatic monomer is adjusted appropriately within the range of 0.5 to 30 percent by weight, preferably 2.5 to 18 percent by weight, and further preferably 7 to 14 percent by weight relative to a total weight of monomers.

Furthermore, in the case where the step (2-b) is conducted after the above-described step (2-a), the following washing step can be adopted. This step can also be conducted in a manner similar to that in the item [1-2-6] Step to wash cross-linked copolymer in the above-described chapter [1-2].

[4-2-6] Step to Wash Cross-Linked Copolymer

A step to remove the above-described leachable compound (I), as necessary, by washing the cross-linked copolymer produced from the monovinyl aromatic monomer and the cross-linkable aromatic monomer in the above-described step (2-a) by using a solvent before the (2-c) sulfonation step described below.

[4-3] (2-c) Step to Sulfonate Cross-Linked Copolymer

The cross-linked copolymer obtained through the steps described in the chapters [4-1] and [4-2] is then sulfonated following the publicly known method for the purpose of introducing ion exchange groups.

For example, a method described in Japanese Unexamined Patent Application Publication No. 5-132565, Japanese Unexamined Patent Application Publication (Translation of PCT Application) No. 10-508061, and the like is used as the method for introducing sulfonic groups.

[4-4] (2-d) Step to Remove Leachable Compound Having Specific Structure from Cross-Linked Copolymer Sulfonated (Sulfonated Cross-Linked Copolymer)

In the present invention, preferably, the sulfonated cross-linked copolymer obtained as described in the chapter [4-3] is then refined by conducting a treatment to remove the leachable compound represented by the formula (III) described below (hereafter may be referred to as "leachable compound (III)") in such a way that the content of the above-described leachable compound (III) is specified to be preferably 400 μg or less, more preferably 100 μg or less, particularly preferably 50 μg or less, and especially preferably 30 μg or less relative to 1 g of the sulfonated cross-linked copolymer. If the content of the leachable compound (III) is large, a cation exchange resin, in which remaining of impurities and generation of decomposition products are suppressed and leachables are reduced, cannot be obtained. It is preferable that the content of the leachable compound (III) is smaller.

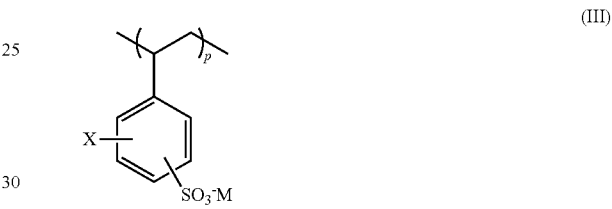

in the formula (III), X represents a hydrogen atom, a halogen atom, or an alkyl group which may be substituted by a halogen atom, M represents a hydrogen atom, a metal atom, or a quaternary ammonium group, and p represents a natural number.

Here, the alkyl group which may be substituted by a halogen atom of X is usually an alkyl group having the carbon number of 1 to 10 or a haloalkyl group, preferably a methyl group, an ethyl group, a propyl group, a butyl group, a halomethyl group, a haloethyl group, a halopropyl group, or a halobutyl group, and further preferably a methyl group, an ethyl group, a halomethyl group, or a haloethyl group. Examples of metal atoms of M include positive ion metals, e.g., sodium, calcium, potassium, iron, zinc, lead, aluminum, manganese, and nickel.

Incidentally, the above-described leachable compound (III) according to the present invention becomes a cause of leachables of ion exchange resin at the time of a product similarly to the above-described leachable compound (I). The breakdown thereof include substances derived from leachable compounds inherently contained in the cross-linked copolymer serving as a base member of sulfonation and substances generated at the stage of sulfonation.

The substances derived from leachable compounds inherently contained in the cross-linked copolymer serving as a base member of sulfonation are sulfonated products of the leachable compound (I) described in the item [4-2] (2-b) and correspond to the substances represented by the above-described formula (III). In addition, substances in which a plurality of sulfonic groups are introduced are also included.

Examples of the substances generated at the stage of sulfonation include substances resulting from oxidation in the sulfonation, and they are also represented by the above-described formula (III). For example, low-molecular-weight and high-molecular-weight polymers and oligomer components generated along with cleavage of a main chain of the cross-linked copolymer are mentioned.

The weight average molecular weight of the leachable compound (III) in terms of polystyrene sulfonate is usually 200 or more, preferably 300 or more, and usually 1,000,000 or less, preferably 100,000 or less. Regarding the leachable compound (III), in the case of a styrene based resin, examples of lower-molecular-weight polymer components which have been polymerized insufficiently include sulfonated products of styrene dimers, styrene trimers, and styrene oligomers, and examples of separable polymer components include sulfonated products of linear polystyrenes and polystyrene fine particles. Furthermore, examples of byproducts due to a chain transfer reaction in the polymerization reaction include sulfonated products of lower polymer components and separable polymer components, in which a polymerization inhibitor contained in a monomer is bonded.

The above-described leachable compound (III) can be removed by, for example, washing the sulfonated cross-linked copolymer obtained in the step (2-c) with water and/or an organic solvent.

This washing method can be executed by a column system, in which the sulfonated cross-linked copolymer is packed into a column and an organic solvent and/or water is passed, or a batch washing method.

The washing temperature is usually room temperature (20° C.) or higher, preferably 30° C. or higher, further preferably 50° C. or higher, and particularly preferably 90° C. or higher, and usually 150° C. or lower, preferably 130° C. or lower, and further preferably 120° C. or lower. If the washing temperature is too high, decomposition of the polymer and fall-off of sulfonic group concur. If the washing temperature is too low, a washing efficiency is reduced.

The contact time with the water and/or the organic solvent is usually 5 minutes or more, preferably 1 hour or more, further preferably 2 hour or more, and usually 4 hours or less. If the contact time is too short, the washing efficiency is reduced, and if the time is too long, the productivity is reduced.

Examples of organic solvents used for washing include aliphatic hydrocarbons having the carbon number of 5 or more, e.g., pentane, hexane, and heptane; aromatic hydrocarbons, e.g., benzene, toluene, xylene, ethylbenzene, and diethylbenzene; alcohols, e.g., methanol, ethanol, propanol, and butanol; ketones, e.g., acetone and methyl ethyl ketone; ethers, e.g., dimethyl ether, diethyl ether, and methylal; chlorine based solvents, e.g., dichloromethane, chloroform, carbon tetrachloride, dichloroethane, and trichloroethane; and phenols, e.g., phenol. One type of them may be used alone, or at least two types may be used in combination. Among them, water, methanol, ethanol, propanol, toluene, and methylal are preferable.

[4-5] Other Treatments

The thus obtained cation exchange resin according to the present invention may be further subjected to various treatments which are usually conducted as treatments for the cation exchange resins. For example, an agglomeration (clumping) prevention treatment may be conducted by a publicly known method.

That is, in general, in the case where the cation exchange resin and the anion exchange resin are used in the mixed bed, the volume of the mixed bed resin formed from the cation exchange resin and the anion exchange resin increases excessively because of an "agglomeration (clumping) phenomenon" in which the cation exchange resin is electrically entangled with the anion exchange resin, so as to cause a handling problem.

Therefore, it is favorable that an agglomeration (clumping) prevention treatment is applied to the cation exchange resin according to the present invention and, thereby, the volume increase ratio in the case where mixing with an anion exchange resin is conducted is specified to be 150% or less, preferably 130% or less, and further preferably 110% or less relative to the volume before mixing. In this regard, the volume increase ratio refers to a proportion of the volume of a mixed bed resin after mixing the anion exchange resin and the cation exchange resin relative to a total of the volumes of the individual resins before mixing on a percentage basis.

As for this agglomeration (clumping) prevention treatment, for example, the publicly known method described in Japanese Unexamined Patent Application Publication No. 10-202118 can be applied.

Specifically, the agglomeration (clumping) prevention treatment can be conducted through a treatment with a water-soluble polymer containing usually 0.01 mmol/L or more, preferably 0.1 mmol/L or more, and usually 10 mmol/L or less, preferably 2 mmol/L or less of cationic dissociative group relative to 1 liter of the cation exchange resin. Specific examples of water-soluble polymers used for the treatment include polyvinylbenzyltrimethylammonium salts and polydiallyldimethylammonium salts. Among them, polyvinylbenzyltrimethylammonium hydroxide is used favorably.

[4-6] Method for Regenerating Cation Exchange Resin

The cation exchange resin according to the present invention can be regenerated by a publicly known generation method.

[5] Properties and Characteristics of Cation Exchange Resin

The cation exchange resin according to the present invention is characterized in that the ΔTOC based on the following item (A) Ultrapure water flow test is 1 ppb or less, and preferably, the above-described volume increase ratio is 150% or less.

A method for manufacturing such a cation exchange resin according to the present invention is not specifically limited. Preferably, production is conducted by the above-described method for manufacturing a cation exchange resin according to the present invention.

(A) Ultrapure Water Flow Test (1) Ultrapure water having a resistivity of 18 MΩ·cm or more and a water temperature of 20° C. to 40° C. is filled into an empty measurement column having a diameter of 30 mm and a length of 1,000 mm under a room temperature condition, the ultrapure water is passed at SV of 30 $hr^{-1}$, and the TOC concentration ($TOC_0$) of the water at the measurement column outlet is measured.

(2) After 500 mL of the above-described cation exchange resin is poured and filled into the above-described measurement column, the above-described ultrapure water is passed through the column at SV of 30 $hr^{-1}$ under a room temperature condition, and the TOC concentration ($TOO_1$) of the water at the measurement column outlet is measured after 20 hours.

(3) The ΔTOC is calculated by the following formula.

$$\Delta TOC(ppb) = TOC_1 - TOC_0$$

As for measuring apparatuses of the resistivity and the TOC concentration in the above-described item (A) Ultrapure water flow test, commercially available measuring apparatuses are used within the bound of not impairing the technical significance of the present invention. In the case of a cation exchange resin used for production of electronic component•material washing ultrapure water, highly accurate measuring apparatuses are desirable.

Examples of the resistivity measuring instruments can include "AQ-11" produced by DKK Corporation. Furthermore, examples of TOC measuring instruments can include "Model A-1000XP", "Model A-1000", "A-100SE", and "S20P" produced by Anatel Corp., and "Model 500RL" produced by Sievers.

In the case where the ΔTOC based on the above-described item (A) Ultrapure water flow test exceeds 1 ppb, the cation exchange resin is not favorable as a cation exchange resin for production of ultrapure water, in particular electronic component•material washing ultrapure water because there is a purity deterioration problem due to leachables. In particular, it is preferable that the ΔTOC is 0.5 ppb or less.

The exchange capacity (meq/mL) per unit volume of the cation exchange resin according to the present invention is usually 1.5 or more, preferably 1.7 or more, and usually 3.0 or less, preferably 2.5 or less.

Furthermore, if the water content of the cation exchange resin according to the present invention is too large, the oxidation resistance deteriorates, and if too small, the ion exchange reaction velocity is reduced at high-speed water flow. Consequently, the water content of 25 percent by weight or more, and 75 percent by weight or less is usually employed. In practice, it is preferable that the range is specified to be 30 percent by weight or more, and 60 percent by weight or less. This water content is measured by a method described in the section of examples explained later.

Moreover, the shape of the cation exchange resin according to the present invention is not specifically limited. Examples of shapes include various shapes, e.g., the shape of a fiber, a powder, a plate, or a film, besides the shape of beads which is used in general. In the case of bead-shaped cation exchange resin, the average particle diameter thereof is usually 100 μm or more, preferably 550 μm or more and usually 1,500 μm or less, preferably 1,000 μm or less.

[6] Methods for Manufacturing Mixed Bed Resin and Ultrapure Water

A mixed bed resin according to the present invention can be produced by a publicly known method described in, for example, Japanese Unexamined Patent Application Publication No. 2002-102719 through any one of combinations of the anion exchange resin according to the present invention and any cation exchange resin, any anion exchange resin and the cation exchange resin according to the present invention, and the anion exchange resin according to the present invention and the cation exchange resin according to the present invention.

In addition, high purity ultrapure water having reduced leachables can be produced by a publicly known method described in, for example, Japanese Unexamined Patent Application Publication No. 2002-102719 through the use of a mixed bed resin including the anion exchange resin according to the present invention and/or the cation exchange resin according to the present invention.

EXAMPLES

The present invention will be described below in further detail. However the present invention is not limited to the following examples within the gist of the invention.

Experimental Example A

Experimental Example Showing Effect of Anion Exchange Resin According to First Aspect of Present Invention Example 1

An oxygen-degassed monomer mixture having an oxygen concentration of 1 mg/L was prepared by mixing 590 g of styrene (industrial grade, produced by Idemitsu Kosan Co., Ltd.) and 85 g (8 percent by weight relative to a total amount of monomers) of divinylbenzene (industrial grade, purity 63 percent by weight, non-polymerizable impurity content 0.09 percent by weight, produced by Dow Chemical Company) and passing a nitrogen gas through the monomer mixture at 1 L/min for 1 hour. The resulting mixture is mixed with 1.8 g of dibenzoyl peroxide (purity 75 percent by weight, wet material, produced by NOF CORPORATION) and 1.4 g of t-butyl peroxybenzoate (purity 99 percent by weight, produced by NOF CORPORATION) and is suspended into 2,025 g of 0.1% polyvinyl alcohol (industrial, Grade GH-20, produced by The Nippon Synthetic Chemical Industry Co., Ltd.) aqueous solution. The suspension was kept at 80° C. for 5 hours while agitation was conducted. Thereafter, a reaction was effected at 120° C. for 4 hours, so that a cross-linked copolymer was obtained.

The resulting cross-linked copolymer was subjected to a leachable test following the procedure described below and, thereby, the amount of leachable polystyrene, which is the leachable compound (I), was quantified.

<Quantification of Amount of Leachable Polystyrene>
1) A cross-linked copolymer is put into an Erlenmeyer flask by 1 part by weight.
2) Tetrahydrofuran (High-speed liquid chromatography grade, produced by Wako Pure Chemical Industries, Ltd.) is added in an amount 4.5 times that of the cross-linked copolymer on a weight basis.
3) Keeping is conducted at 40° C. for 5 hours.
4) A supernatant fluid of the resulting tetrahydrofuran and water are mixed at a ratio of 1:7 (volume ratio).
5) The turbidity of the resulting solution is measured with a UV method, and the amount of leachable polystyrene is determined on the basis of a calibration curve of a tetrahydrofuran solution of reference polystyrene, measured in the same manner.

The above-described cross-linked copolymer was put into a round bottom four neck flask by 150 g, and 525 g of chloromethyl methyl ether (purity 90%, homemade product) was added. The cross-linked copolymer was swelled at room temperature over 8 hours sufficiently. Thereafter, 56 g of zinc chloride (produced by HANWA INDUSTRIAL CO., LTD.) was added as the Friedel-Crafts reaction catalyst, the temperature of a bath was set at 40° C., and a reaction was effected for 8 hours while agitation was conducted, so that a chloromethylated cross-linked copolymer was obtained.

The above-described chloromethylated cross-linked copolymer was batch-washed for 13 hours with methanol (produced by Japan Alcohol Trading Co., Ltd.) in an amount 3.5 times that of the copolymer on a volume basis and toluene (reagent, produced by Wako Pure Chemical Industries, Ltd.) in an amount 10 times that of the copolymer on a volume basis and, thereafter, 30 percent by weight trimethylamine aqueous solution (reagent produced by Wako Pure Chemical Industries, Ltd.) was added. A reaction was effected at 30° C. for 8 hours while agitation was conducted, so that a type I quaternary ammonium type anion exchange resin (Cl type) was obtained.

The exchange capacity and the water content of the above-described type I quaternary ammonium type anion exchange resin were measured by employing [methods for measuring exchange capacity $Q_{Cl}$ and water content $W_{Cl}$] described above in the item [3-1-1].

Furthermore, the type I quaternary ammonium type anion exchange resin obtained as described above was put into a reaction container, and agitation was conducted at 100° C. for 8 hours in a 1-N—NaOH (produced by Wako Pure Chemical Industries, Ltd.) aqueous solution. Thereafter, the resin was taken out and filled into a column, followed by water washing. Subsequently, sodium bicarbonate aqueous solution (reagent produced by Wako Pure Chemical Industries, Ltd.) and NaOH (reagent produced by Wako Pure Chemical Industries, Ltd.) aqueous solution were passed, so as to effect regeneration and conversion to an OH type anion exchange resin.

After the regeneration, the resin was put into a beaker, and a polystyrene sulfonate solution having an average molecular weight of $1 \times 10^4$ was added while agitation was conducted. The amount of sulfonic group relative to 1 liter of anion exchange resin was specified to be 0.2 mmol/L-resin. The resulting slurry was transferred into a column, reagent methanol was passed at room temperature, and finally, water washing was conducted with ultrapure water, so as to produce an anion exchange resin for ultrapure water.

The exchange capacity and the water content of the OH type anion exchange resin were measured by employing [methods for measuring exchange capacity $Q_{OH}$ and water content $W_{OH}$] described above in the item [3-1-2].

In addition, the ΔTOC of the resulting anion exchange resin was determined on the basis of the above-described item (A) Ultrapure water flow test.

The results thereof are shown in Table 1.

In this regard, the divinylbenzene content in the entire monomers in synthesis of the cross-linked copolymer, the haloalkyl group introduction ratio in haloalkylation of the cross-linked copolymer, and the chlorine content in the haloalkylated cross-linked copolymer are shown in Table 1 together.

Moreover, the presence or absence of batch washing of the chloromethylated cross-linked copolymer with methanol and toluene and the amount of removal of the above-described leachable compound (II) due to the batch washing, which are the results of examination by the following method, are shown in Table 1.

<Quantification of Amount of Removal of Leachable Compound (II)>
1) A solution obtained by washing the chloromethylated cross-linked copolymer with toluene is taken into a sample bottle by 1 part by volume.
2) Methanol (extra pure grade reagent produced by Wako Pure Chemical Industries, Ltd.) is added by 2 parts by volume to the solution described in the item 1) and mixing is conducted.
3) The turbidity of the resulting solution is measured with a UV method, and the amount of removal of leachable compound (II) is determined on the basis of a calibration curve of a toluene solution of reference polystyrene, measured in the same manner.

Incidentally, a symbol "-" in Table 1 indicates that there is no data.

Example 2

An anion exchange resin was produced as in Example 1 except that styrene and divinylbenzene were copolymerized while the divinylbenzene content in the entire monomers was specified to be 10 percent by weight. The individual measurement results are shown in Table 1.

Example 3

An anion exchange resin was produced as in Example 1 except that styrene and divinylbenzene were copolymerized while the divinylbenzene content in the entire monomers was specified to be 4.5 percent by weight, and the temperature of the chloromethylation reaction bath was set at 30° C. The individual measurement results are shown in Table 1.

Example 4

An anion exchange resin was produced as in Example 1 except that the amount of catalyst in the chloromethylation was specified to be 45 g. The individual measurement results are shown in Table 1. Furthermore, regarding the resulting anion exchange resin, the measurement of crush strength described above in the chapter [3-4] and the measurement of volume increase ratio described above in the chapter [3-3] were also conducted and the results thereof are also shown in Table 1.

Example 5

An anion exchange resin was produced as in Example 4 except that the temperature of the chloromethylation reaction bath was set at 45° C. The individual measurement results are shown in Table 1. Furthermore, regarding the resulting anion exchange resin, the measurement of crush strength described above in the chapter [3-4] was also conducted and the results thereof are also shown in Table 1.

Example 6

An anion exchange resin was produced as in Example 1 except that styrene and divinylbenzene were copolymerized while the divinylbenzene content in the entire monomers was specified to be 4.5 percent by weight, and the amount of catalyst in the chloromethylation was specified to be 45 g. The individual measurement results are shown in Table 1.

Example 7

An anion exchange resin was produced as in Example 1 except that the styrene-divinylbenzene cross-linked copolymer having a uniform particle diameter of 390 μm was produced with the same charge composition as the charge composition in Example 1 and the amount of catalyst in the chloromethylation was specified to be 45 g. The individual measurement results are shown in Table 1. Furthermore, regarding the resulting anion exchange resin, the measurement of crush strength described above in the chapter [3-4] and the measurement of volume increase ratio described above in the chapter [3-3] were also conducted and the results thereof are also shown in Table 1.

Comparative Example 1

An anion exchange resin was produced as in Example 1 except that styrene and divinylbenzene were copolymerized while the divinylbenzene content in the entire monomers was specified to be 4.5 percent by weight, and the temperature of the chloromethylation reaction bath was set at 60° C. The individual measurement results are shown in Table 1.

Comparative Examples 2 and 3

Anion exchange resins were produced as in Comparative example 1 except that styrene and divinylbenzene were copolymerized while the divinylbenzene content in the entire monomers was specified to be 8 or 6 percent by weight. The individual measurement results are shown in Table 1.

Comparative Example 4

A cross-linked copolymer was produced as in Example 1 except that styrene and divinylbenzene were reacted while the divinylbenzene content in the entire monomers was specified to be 4.5 percent by weight.

Chloromethyl methyl ether in an amount of 490 parts by weight was added to 140 parts by weight of the resulting cross-linked copolymer and the cross-linked copolymer was swelled sufficiently. Thereafter, 52 parts by weight of zinc chloride was added as the Friedel-Crafts reaction catalyst, the temperature of the bath was kept at 50° C., and a reaction was effected for 8 hours while agitation was conducted.

An anion exchange resin was produced as in Example 1 by using the resulting chloromethylated cross-linked copolymer. The individual measurement results are shown in Table 1. Furthermore, regarding the resulting anion exchange resin, the measurement of crush strength described above in the chapter [3-4] was also conducted and the results thereof are shown in Table 1.

Comparative Example 5

An anion exchange resin was produced as in Example 1 except that styrene and divinylbenzene were copolymerized while the divinylbenzene content in the entire monomers was specified to be 4.5 percent by weight, and the temperature of the chloromethylation reaction bath was set at 50° C. The individual measurement results are shown in Table 1.

Comparative Example 6

An anion exchange resin was produced as in Comparative example 5 except that batch washing of the chloromethylated cross-linked copolymer with methanol and toluene was not conducted. The individual measurement results are shown in Table 1.

Reference Example 1

As for Reference example 1, the water content, the exchange capacity, and the $\Delta$TOC data based on the ultrapure water flow test of a commercially available OH type anion exchange resin (trade name DIAION (registered trade mark) SAT20L Lot 4L682, produced by MITSUBISHI CHEMICAL CORPORATION) are shown in Table 1.

TABLE 1

| | Divinylbenzene content in entire monomers (percent by weight) | Amount of leachable polystyrene per gram of cross-linked copolymer (μg/g-cross-linked copolymer) | Chlorine content (percent by weight) | Haloalkyl group introduction ratio (percent by mole) | Presence or absence of washing of chloromethylated cross-linked copolymer * | Cl type anion exchange resin | | |
|---|---|---|---|---|---|---|---|---|
| | | | | | | Water content $W_{Cl}$ (percent by weight) | Exchange capacity $Q_{Cl}$ (meq/mL) | Whether formulae (1) to (5) are satisfied |
| Example 1 | 8 | 96 | 13 | 62 | washing (114) | 40 | 1.22 | satisfied |
| Example 2 | 10 | 77 | 12 | 56 | washing (33) | 35 | 1.20 | satisfied |
| Example 3 | 4.5 | 149 | 15 | 66 | washing (261) | 54 | 0.96 | satisfied |
| Example 4 | 8 | 96 | 13 | 58 | washing (92) | 39 | 1.20 | satisfied |
| Example 5 | 8 | 205 | 14 | 64 | washing (53) | 40 | 1.33 | satisfied |
| Example 6 | 4.5 | — | 15.5 | 70 | washing (338) | 53 | 1.1 | satisfied |
| Example 7 | 8 | 202 | 12.3 | 57 | washing (—) | 39 | 1.27 | satisfied |
| Comparative example 1 | 4.5 | 149 | 23 | 102 | washing (58) | 52 | 1.48 | not satisfied |
| Comparative example 2 | 8 | 96 | 18 | 84 | no washing | 41 | 1.51 | not satisfied |
| Comparative example 3 | 6 | 456 | — | — | no washing | 45 | 1.38 | not satisfied |
| Comparative example 4 | 4.5 | 150 | 20.6 | 93 | no washing | 54 | 1.35 | not satisfied |
| Comparative example 5 | 4.5 | 149 | 20.6 | 93 | washing (217) | 52 | 1.36 | not satisfied |
| Comparative example 6 | 4.5 | 149 | 20.6 | 93 | no washing | 51 | 1.34 | not satisfied |
| Reference example 1 | SAT20L | — | — | — | — | 45 | 1.4 | — |

| | OH type anion exchange resin | | | | | |
|---|---|---|---|---|---|---|
| | Water content $W_{OH}$ (percent by weight) | Exchange capacity $Q_{OH}$ (meq/mL) | Whether formulae (6) and (7) are satisfied | Ultrapure water flow test $\Delta$TOC (ppb) | Crush strength (N/particle) | Volume increase ratio (%) |
| Example 1 | — | 0.99 | satisfied | 0.02 | — | — |
| Example 2 | — | 0.97 | satisfied | 0.06 | — | — |
| Example 3 | — | — | satisfied | 0.11 | — | — |
| Example 4 | 56 | 0.94 | satisfied | 0.05 | 11.0 | 103 |

TABLE 1-continued

|  | | | | | | |
|---|---|---|---|---|---|---|
| Example 5 | 55 | 1.02 | satisfied | 0.17 | 11.5 | — |
| Example 6 | 71 | 0.80 | satisfied | 0.14 | — | — |
| Example 7 | 56 | 1.02 | satisfied | 0.22 | 11.8 | 105 |
| Comparative example 1 | 61 | 1.23 | not satisfied | 0.29 | — | — |
| Comparative example 2 | 56 | 1.27 | not satisfied | 0.24 | — | — |
| Comparative example 3 | 65 | 1.15 | not satisfied | 0.37 | — | — |
| Comparative example 4 | 66 | 1.11 | not satisfied | 0.43 | 3.4 | — |
| Comparative example 5 | 67 | 1.10 | not satisfied | 0.70 | — | — |
| Comparative example 6 | 67 | 1.10 | not satisfied | 0.44 | — | — |
| Reference example 1 | 66 | 1.0 | not satisfied | 0.42 | — | — |

* Numbers in parentheses indicate amounts of leachable compounds (II) removed from chloromethylated cross-linked copolymers through batch washing with methanol and toluene (unit: μg/g-chloromethylated cross-linked copolymer)

Reference Examples 2 to 13

As for Reference examples 2 to 13, the water contents and the exchange capacities of commercially available Cl type anion exchange resins are shown in Table 2.

The values of DIAION (registered trade mark: produced by MITSUBISHI CHEMICAL CORPORATION) indicate lower limits of the standards of the water content and the exchange capacity, respectively. Furthermore, regarding Amberlite (registered trade mark: produced by Rohm and Haas), lower limits of the water content and the exchange capacity described in a reference ("Ion Koukan Jushi Sono Gijutsu to Ouyou (Ion Exchange Resin Technology and Application thereof)", Jitsuyou hen (Part of Practice), ORGANO CORPORATION, revised second edition, March 1997), page 2, "List of Amberlite (negative ion exchange resin)" are shown.

TABLE 2

| | | Cl type anion exchange resin | |
|---|---|---|---|
| | Trade name | Water content $W_{Cl}$ (percent by weight) | Exchange capacity $Q_{Cl}$ (meq/mL) |
| Reference example 2 | DIAION SA10A | 43 | 1.25 |
| Reference example 3 | DIAION SA11A | 55 | 0.85 |
| Reference example 4 | DIAION NSA100 | 37 | 1.3 |
| Reference example 5 | DIAION SA12A | 48 | 1.25 |
| Reference example 6 | DIAION SA12AP | 48 | 1.2 |
| Reference example 7 | DIAION SA12AR | 48 | 1.15 |
| Reference example 8 | DIAION SA10DL | 38 | 1.3 |
| Reference example 9 | Amberlite IRA400J Cl | 43 | 1.4 |
| Reference example 10 | Amberlite IRA400T Cl | 40 | 1.4 |
| Reference example 11 | Amberlite IRA404J Cl | 61 | 0.9 |
| Reference example 12 | Amberlite IRA402J Cl | 49 | 1.25 |
| Reference example 13 | Amberlite IRA402BL Cl | 49 | 1.25 |

FIG. 1 shows the relationship between the water content and the exchange capacity of Cl type anion exchange resins of Examples, Comparative examples, and Reference examples.

Figure 2:
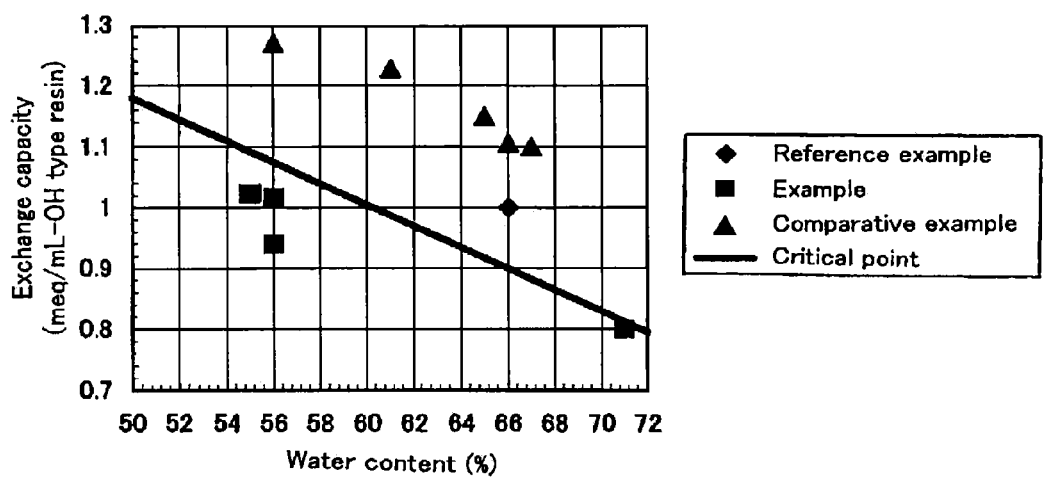
FIG. 2 is a graph showing the relationship between the water content and the exchange capacity of OH type anion exchange resins of Examples, Comparative examples, and Reference examples in Experimental example A.

FIG. 2 shows the relationship between the water content and the exchange capacity of OH type anion exchange resins of Examples, Comparative examples, and Reference examples.

Figure 3:
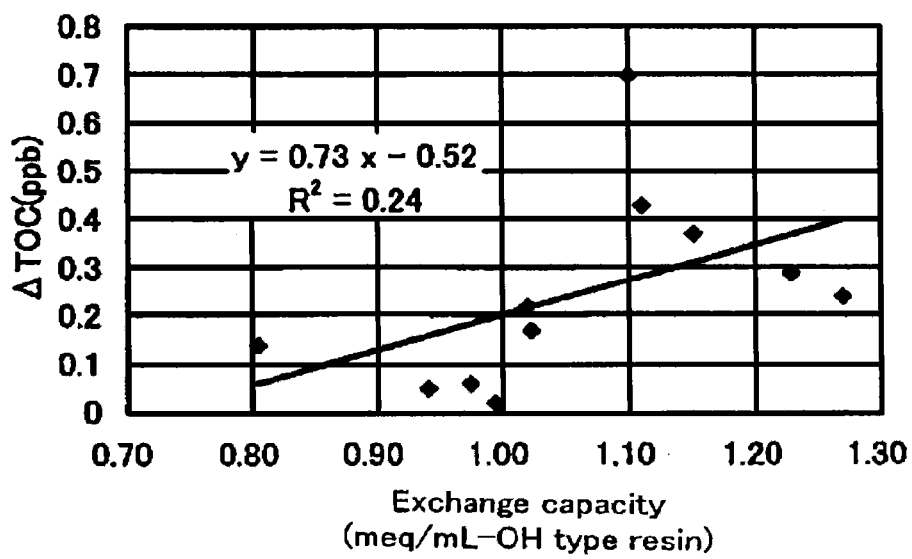
FIG. 3 is a graph showing the relationship between the exchange capacity of OH type anion exchange resins and the ΔTOC based on an ultrapure water washing test of Examples and Comparative examples in Experimental example A.
Figure 4:
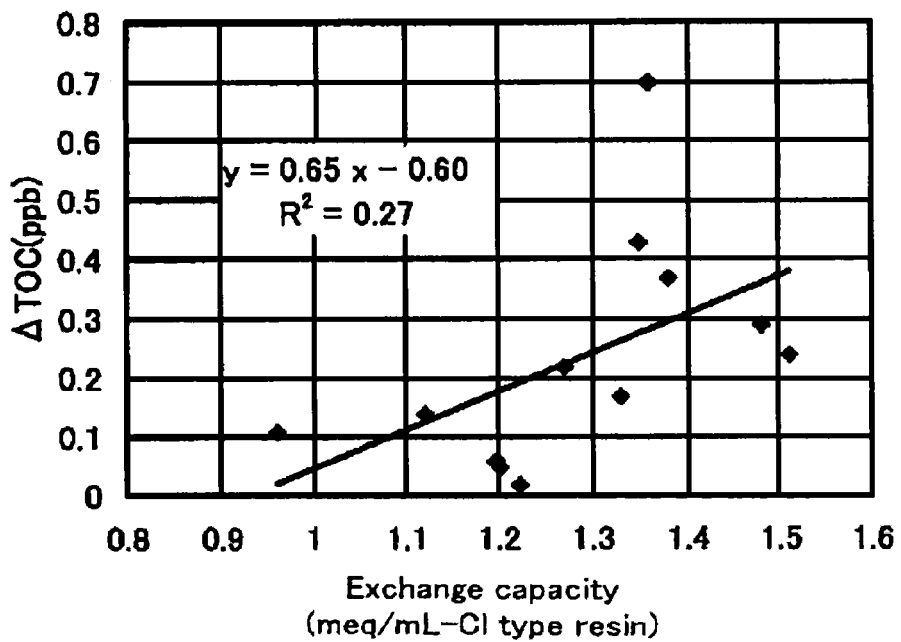
FIG. 4 is a graph showing the relationship between the exchange capacity of Cl type anion exchange resins and the ΔTOC based on an ultrapure water washing test of OH type anion exchange resins prepared by using the Cl type anion exchange resins of Examples and Comparative examples in Experimental example A.

Furthermore, FIG. 3 shows a plot in which the horizontal axis indicates the exchange capacity of the OH type anion exchange resins described in Examples and Comparative examples and the vertical axis indicates the ΔTOC based on an ultrapure water washing test thereof. FIG. 4 shows a plot in which the horizontal axis indicates the exchange capacity of the Cl type anion exchange resin and the vertical axis indicates the ΔTOC based on an ultrapure water washing test of the OH type anion exchange resin prepared by using the Cl type anion exchange resin.

As is clear from comparisons between exchange capacities and the water contents of the anion exchange resins shown in Tables 1 and 2, each of the anion exchange resins obtained in the present invention has a small exchange capacity as compared with that of the resin which is produced by the conventional method and which has nearly the same water content. Furthermore, as is clear from comparisons of the values of ΔTOC, all anion exchange resins according to the present invention have low ΔTOC values as compared with the resin produced by the conventional method. Moreover, all the amounts of leachable polystyrene at the polymerization stage are low as compared with that of the cross-linked copolymer produced by the conventional method.

In addition, every volume increase ratio in the case where the anion exchange resin was mixed with a cation exchange resin did not exceed 150% of the volume before mixing.

Incidentally, as is clear from each of FIGS. 3 and 4, there is a positive interrelation between the exchange capacity of the anion exchange resin and the ΔTOC.

As for the reason there is a positive interrelation between the exchange capacity and the ΔTOC as shown in FIG. 3 and FIG. 4, it is believed that since an anion exchange resin including no exchange group (that is, a cross-linked copolymer of a monovinyl aromatic monomer and a cross-linkable aromatic monomer) contains no water-soluble eluate, the ΔTOC approaches zero infinitely.

Furthermore, as is clear from FIG. 3, in the case where the exchange capacity of the OH type anion exchange resin is 1.10 meq/mL or less, the ΔTOC is reduced than that of the conventional resin.

Moreover, as is clear from FIG. 4, in the case where the exchange capacity of the Cl type anion exchange resin is 1.38 meq/mL or less, the ΔTOC is reduced than that of the conventional resin.

{ΔTOC Based on Ultrapure Water Flow Test}

Example 8

Ultrapure water having a resistivity of 18.2 MΩ·cm or more, a water temperature of 25° C., and a TOC of 0.5 µg/L was filled into an empty column having a diameter of 40 mm and a length of 500 mm under a room temperature condition, the ultrapure water was passed at SV of 60 hr$^{-1}$, and the TOC concentration ($TOC_0$) at the measurement column outlet was measured.

Subsequently, after 500 mL of the anion exchange resin of Example 1 was filled into the above-described measurement column, the above-described ultrapure water was passed through the column at SV of 60 hr$^{-1}$ under a room temperature condition, and the TOC concentration ($TOC_1$) at the measurement column outlet was measured.

The ΔTOC was calculated by the following formula. The results are shown in Table 5.

$$\Delta TOC = TOC_1 - TOC_0$$

In this regard, "A-1000" produced by Anatel Corp., was used as a TOC measuring instrument.

Comparative Example 7

The ΔTOC was calculated as in Example 8 except that an anion exchange resin for ultrapure water production (trade name EX-AG) produced by Kurita Water Industries Ltd., was used. The results are shown in Table 5.

Figure 5:
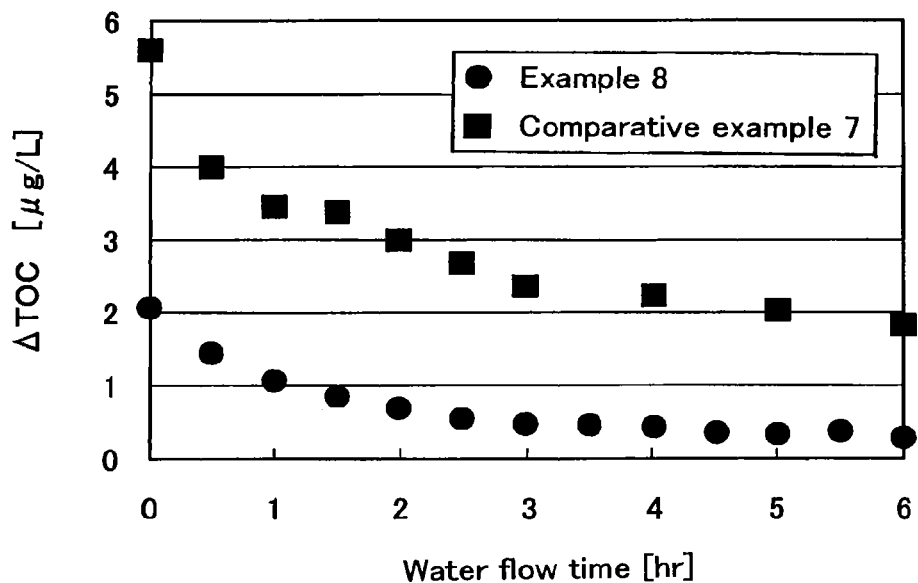
FIG. 5 is a graph showing the change with time of the ΔTOC based on an ultrapure water flow test of Example 8 and Comparative example 7 in Experimental example A.

As is clear from FIG. 5, regarding the resin of Example 8, the ΔTOC is low from the initial stage of water flow. Therefore, it is clear that the anion exchange resin obtained in the present invention exhibits low leachable of TOC as compared with other anion exchange resins.

Experimental Example B

Experimental Example Showing Effect of Anion Exchange Resin According to Second Aspect of Present Invention Example 9

Mixing of 621 g of styrene (industrial grade, produced by Idemitsu Kosan Co., Ltd.), 54 g of divinylbenzene (industrial grade, purity 63 percent by weight, produced by Dow Chemical Company), 0.9 g of dibenzoyl peroxide (purity 75 percent by weight, wet material, produced by NOF CORPORATION), and 0.7 g of t-butyl peroxybenzoate (purity 99 percent by weight, produced by NOF CORPORATION) was conducted. The resulting mixture was suspended into 2,025 g of 0.1% polyvinyl alcohol (industrial, Grade GH-20, produced by The Nippon Synthetic Chemical Industry Co., Ltd.) aqueous solution. The suspension was kept at 80° C. for 5 hours while agitation was conducted. Thereafter, a reaction was effected at 120° C. for 4 hours, so that a cross-linked copolymer was obtained.

The above-described cross-linked copolymer was put into a round bottom four neck flask by 150 g, and 900 g of chloromethyl methyl ether (reagent produced by Wako Pure Chemical Industries, Ltd.) was added. The cross-linked copolymer was swelled sufficiently. Thereafter, 56 g of zinc chloride (produced by HANWA INDUSTRIAL CO., LTD.) was added as the Friedel-Crafts reaction catalyst, the temperature of a bath was set at 50° C., and a reaction was effected for 8 hours while agitation was conducted, so that a chloromethylated cross-linked copolymer was obtained.

The above-described chloromethylated cross-linked copolymer was batch-washed with methanol (produced by Japan Alcohol Trading Co., Ltd.) and toluene (reagent, produced by Wako Pure Chemical Industries, Ltd.) and, thereafter, 30 percent by weight trimethylamine aqueous solution (reagent produced by Wako Pure Chemical Industries, Ltd.) was added. A reaction was effected at 50° C. for 8 hours while agitation was conducted, so that a type I quaternary ammonium type anion exchange resin (Cl type) was obtained.

The exchange capacity and the water content of the resulting Cl type anion exchange resin were measured by employing [methods for measuring exchange capacity $Q_{Cl}$ and water content $W_{Cl}$] described above in the item [3-1-1]. The results are shown in Table 3.

The Type I quaternary ammonium type anion exchange resin obtained as described above was put into a reaction container, and agitation was conducted at 100° C. for 8 hours in a 1-N—NaOH (produced by Wako Pure Chemical Industries, Ltd.) aqueous solution. Thereafter, the resin was taken out and filled into a column, followed by water washing. Subsequently, sodium bicarbonate aqueous solution (reagent produced by Wako Pure Chemical Industries, Ltd.) and NaOH (reagent produced by Wako Pure Chemical Industries, Ltd.) aqueous solution were passed so as to effect regeneration and conversion to an OH type anion exchange resin.

After the regeneration, the resin was put into a beaker, a polystyrene sulfonate aqueous solution having an average molecular weight of 1×10$^4$ (polystyrene sulfonate concentration 0.2 mmol/L) was added by the same volume as the volume of the anion exchange resin, and agitation was conducted for 30 minutes. The amount of sulfonic group relative to 1 liter of anion exchange resin was specified to be 0.2 mmol/L-resin. The resulting slurry was transferred into a column, reagent methanol was passed at room temperature, and finally, water washing was conducted with ultrapure water, so as to produce an anion exchange resin for ultrapure water.

The resulting anion exchange resin was subjected to the above-described item (B) Silicon wafer test, and the wafer surface flatness was examined. The results are shown in Table 3.

Example 10

Mixing of 590 g of styrene (industrial grade, produced by Idemitsu Kosan Co., Ltd.), 85 g of divinylbenzene (industrial grade, purity 63 percent by weight, produced by Dow Chemical Company), 1.8 g of dibenzoyl peroxide (purity 75 percent by weight, wet material, produced by NOF CORPORATION), and 1.4 g of t-butyl peroxybenzoate (purity 99 percent by weight, produced by NOF CORPORATION) was conducted. The resulting mixture was suspended into 2,025 g of 0.1% polyvinyl alcohol (industrial, Grade GH-20, produced by The Nippon Synthetic Chemical Industry Co., Ltd.) aqueous solution. The suspension was kept at 80° C. for 5 hours while agitation was conducted. Thereafter, a reaction was effected at 120° C. for 4 hours, so that a cross-linked copolymer was obtained.

The above-described cross-linked copolymer was put into a round bottom four neck flask by 150 g, and 490 g of chloromethyl methyl ether (reagent produced by Wako Pure Chemical Industries, Ltd.) was added. The copolymer was swelled sufficiently. Thereafter, 45 g of zinc chloride (produced by HANWA INDUSTRIAL CO., LTD.) was added as the Friedel-Crafts reaction catalyst, the temperature of a bath was set at 40° C., and a reaction was effected for 8 hours while agitation was conducted, so that a chloromethylated cross-linked copolymer was obtained.

The above-described chloromethylated cross-linked copolymer in an amount of 10 g was batch-washed with methanol (produced by Japan Alcohol Trading Co., Ltd.) and toluene (reagent, produced by Wako Pure Chemical Industries, Ltd.) and, thereafter, 30 percent by weight trimethylamine aqueous solution (reagent produced by Wako Pure Chemical Industries, Ltd.) was added. A reaction was effected at 30° C. for 8 hours while agitation was conducted, so that a Type I quaternary ammonium type anion exchange resin (Cl type) was obtained.

The exchange capacity and the water content of the resulting Cl type anion exchange resin were measured by employing [methods for measuring exchange capacity $Q_{Cl}$ and water content $W_{Cl}$] described above in the item [3-1-1]. The results are shown in Table 3.

The Type I quaternary ammonium type anion exchange resin obtained as described above was put into a reaction container, and agitation was conducted at 100° C. for 8 hours in a 1-N—NaOH (produced by Wako Pure Chemical Industries, Ltd.) aqueous solution. Thereafter, the resin was taken out and filled into a column, followed by water washing. Subsequently, sodium bicarbonate aqueous solution (reagent produced by Wako Pure Chemical Industries, Ltd.) and NaOH (reagent produced by Wako Pure Chemical Industries, Ltd.) aqueous solution were passed so as to effect regeneration and conversion to an OH type anion exchange resin.

After the regeneration, the resin was put into a beaker, a polystyrene sulfonate aqueous solution having an average molecular weight of $1 \times 10^4$ was added while agitation was conducted. The amount of sulfonic group relative to the anion exchange resin was specified to be 0.2 meq/L-resin. The resulting slurry was transferred into a column, reagent methanol was passed at room temperature, and finally, water washing was conducted with ultrapure water, so as to produce an anion exchange resin for ultrapure water.

The exchange capacity and the water content of the resulting OH type anion exchange resin were measured by employing [methods for measuring exchange capacity $Q_{OH}$ and water content $W_{OH}$] described above in the item [3-1-2]. The results are shown in Table 3.

Furthermore, the resulting anion exchange resin was subjected to the above-described item (A) Ultrapure water flow test so as to determine the ΔTOC and, in addition, was subjected to the above-described item (B) Silicon wafer test so as to examine the wafer surface flatness. The results are shown in Table 3.

Moreover, regarding this anion exchange resin, the measurement of the crush strength described above in the chapter [3-4] and the measurement of the volume increase ratio described in the chapter [3-3] were conducted as well. The results are also shown in Table 3.

Comparative Example 8

An anion exchange resin for ultrapure water was prepared as in Example 9 except that the treatment with the polystyrene sulfonate solution was not conducted.

The resulting anion exchange resin was subjected to the above-described item (B) Silicon wafer test, and the wafer surface flatness was examined. The results are shown in Table 3.

TABLE 3

| | Cl type anion exchange resin | | | OH type anion exchange resin | | | | | | |
|---|---|---|---|---|---|---|---|---|---|---|
| | Water content $W_{Cl}$ (percent by weight) | Exchange capacity $Q_{Cl}$ (meq/mL) | Whether formulae (1) to (5) are satisfied | Water content $W_{OH}$ (percent by weight) | Exchange capacity $Q_{OH}$ (meq/mL) | Whether formulae (6) and (7) are satisfied | Wafer surface flatness | Ultrapure water flow test ΔTOC (ppb) | Crush strength (N/particle) | Volume increase ratio (%) |
| Example 9 | 51 | 1.36 | not satisfied | — | — | — | 3.5 Å | — | — | — |
| Example 10 | 39 | 1.20 | satisfied | 56 | 0.94 | satisfied | 2.9 Å | 0.05 | 11.0 | 103 |
| Comparative example 8 | 51 | 1.36 | not satisfied | — | — | — | 4.3 Å | — | — | — |

As is clear from table 3, an anion exchange resin having reduced leachables and not easily causing deterioration of the flatness of the silicon wafer is obtained.

Experimental Example C

Experimental Example Showing Effect of Cation Exchange Resin According to Present Invention Example 11

An oxygen-degassed monomer mixture having an oxygen concentration of 3 mg/L was prepared by mixing 497 parts by weight of styrene (industrial grade, produced by Idemitsu Kosan Co., Ltd.) and 93 parts by weight of divinylbenzene (industrial grade, purity 63 percent by weight, non-polymerizable impurity content 0.09 percent by weight, produced by Dow Chemical Company) and passing a nitrogen gas in an amount 5 times the volume of the monomer mixture through a gas phase portion (the same amount as the monomer volume) on an upper surface in a mixed monomer tank over 1 hour. The resulting monomer mixture was mixed with 1.0 parts by weight of dibenzoyl peroxide (purity 75 percent by weight, wet material, produced by NOF CORPORATION) and 0.8 parts by weight of t-butyl peroxybenzoate (purity 99 percent by weight, produced by NOF CORPORATION) and was suspended into 1,950 parts by weight of 0.1% polyvinyl alcohol (industrial, Grade GH-20, produced by The Nippon Synthetic Chemical Industry Co., Ltd.) aqueous solution. The suspension was kept at 80° C. for 5 hours while agitation was conducted. Thereafter, a reaction was effected at 120° C. for 4 hours, so that a cross-linked copolymer was obtained.

The resulting cross-linked copolymer was subjected to a leachable test in a manner similar to the procedure of quantification of the amount of leachable polystyrene in Example 1 in Experimental example A and, thereby, the amount of leachable polystyrene, which is the leachable compound (I), was quantified.

The above-described cross-linked copolymer was put into a reactor by 300 parts by weight, and 900 parts by weight of nitrobenzene (reagent produced by Wako Pure Chemical Industries, Ltd.) was added. The copolymer was swelled sufficiently. Thereafter, 3,150 parts by weight of 98% sulfuric acid (reagent grade produced by KISHIDA CHEMICAL Co., Ltd.) was added, the temperature of a bath was set at 105° C., and a reaction was effected for 8 hours while agitation was conducted, so that sulfonation is effected and a bead-shaped cation exchange resin having an average particle diameter of 650 μm was obtained.

The resulting cation exchange resin was dispersed into water, the volume of which was 1.3 times the volume of the cation exchange resin, the temperature was raised to 120° C., and batch washing for 120 minutes was repeated 4 times. Thereafter, regeneration was conducted with diluted hydrochloric acid (35% hydrochloric acid produced by Wako Pure Chemical Industries, Ltd., was diluted) and, furthermore, washing was conducted by passing ultrapure water, the volume of which was 140 times the volume of the cation exchange resin.

Regarding the resulting cation exchange resin, the ion exchange capacity and the water content were measured by the following methods.

<Measurement of Ion Exchange Capacity>

About 8 g of sample was taken, and the sample was weighed accurately. Thereafter, 250 mL of 5 percent by weight saline solution was allowed to run at downflow SV of 70 hr$^{-1}$. The filtrate was received with a 250-mL volumetric flask and was diluted to volume. A liquid was taken therefrom by 50 mL with a whole pipette accurately and was titrated with 0.1-mol/L-NaOH by using a Methyl red-Methylene blue mixed indicator. Then, the exchange capacity was calculated.

<Measurement of Water Content>

About 5 g of sample was taken into a weighing bottle, and the sample was weighed accurately. The resulting sample was put into an electric dryer at 105±2° C. and was dried for 4 hours. Subsequently, the sample was stood in a desiccator for cooling, the weight (g) thereof was measured, and the water content was calculated.

Furthermore, the resulting cross-linked copolymer was subjected to the above-described item (A) Ultrapure water flow test so as to determine the ΔTOC.

The results thereof are shown in Table 4.

Example 12

A cross-linked copolymer was obtained as in Example 11 except that the amount of dibenzoyl peroxide was specified to be 1.6 parts by weight and the amount of t-butyl peroxybenzoate was specified to be 1.2 parts by weight. A cation exchange resin was obtained in a manner similar to that in Example 11 by using the resulting cross-linked copolymer.

The resulting cross-linked copolymer and the cation exchange resin were evaluated as in Example 11. The results are shown in Table 4.

Example 13

A cross-linked copolymer and a cation exchange resin were obtained as in Example 12 except that the number of batch washing, in which the cation exchange resin was dispersed into water and the temperature was raised to 120° C., was specified to be 2 times.

The resulting cross-linked copolymer and cation exchange resin were evaluated as in Example 11. The results are shown in Table 4.

Comparative Example 9

Mixing of 667 parts by weight of styrene (industrial grade, produced by Idemitsu Kosan Co., Ltd.), 89 parts by weight of divinylbenzene (industrial grade, purity 57 percent by weight, non-polymerizable impurity content 4.8 percent by weight, produced by Nippon Steel Chemical Co., Ltd.), and 0.6 parts by weight of dibenzoyl peroxide (purity 75 percent by weight, wet material, produced by NOF CORPORATION) was conducted. The resulting mixture was suspended into 1,764 parts by weight of 0.1% polyvinyl alcohol aqueous solution (GH-20, produced by The Nippon Synthetic Chemical Industry Co., Ltd.). A reaction was effected at 75° C. for 8 hours while the suspension was agitated, so that a cross-linked copolymer was obtained.

The above-described cross-linked copolymer was put into a reactor by 300 parts by weight, and 600 parts by weight of nitrobenzene (reagent produced by Wako Pure Chemical Industries, Ltd.) was added. The copolymer was swelled sufficiently. Thereafter, 2,100 parts by weight of 98% sulfuric acid (reagent grade produced by KISHIDA CHEMICAL Co., Ltd.) was added, the temperature of a bath was set at 105° C., and a reaction was effected for 8 hours while agitation was conducted, so that a sulfonated copolymer was obtained.

The resulting cation exchange resin was regenerated with hydrochloric acid and, furthermore, washing was conducted by passing ultrapure water, the volume of which was 600 times the volume of the cation exchange resin.

The resulting cross-linked copolymer and the cation exchange resin were evaluated as in Example 11. The results are shown in Table 4.

TABLE 4

| | Amount of leachable polystyrene per gram of cross-linked copolymer (μg/g-cross-linked copolymer) | Cation exchange resin | | | |
|---|---|---|---|---|---|
| | | Ion exchange capacity | | Water content (percent by weight) | ΔTOC (ppb) |
| | | (meq/ml) | (meq/g) | | |
| Example 11 | 95 | 2.2 | 5.1 | 47 | 0.5 |
| Example 12 | 207 | 2.2 | 5.1 | 46 | 0.5 |
| Example 13 | 209 | 2.2 | 5.1 | 47 | 0.3 |
| Comparative example 9 | 616 | 1.8 | 5.0 | 53 | 3.5 |

As is clear from comparisons of the values of ΔTOC shown in Table 4, all cation exchange resins obtained in the present invention have low ΔTOC values as compared with the resin produced by the conventional method. Moreover, all the amounts of leachable polystyrene at the polymerization stage are low as compared with that of the polymer polymerized by the conventional method.

Regarding Examples 11 to 13, the ΔTOC was reduced to 0.3 to 0.5 ppb in spite of the fact that washing was conducted with merely 140 BV.

On the other hand, regarding Comparative example 9, the ΔTOC of 3.5 ppb was detected in spite of the fact that washing was conducted with ultrapure water in an amount of 600 times.

This is because the cross-linked copolymer synthesis conditions of Examples 11 to 13 and Comparative example 9 are different as described below and, thereby, in Examples 11 to 13, the cross-linked copolymer having a small leachable polystyrene was able to be obtained. That is, in Examples 11 to 13, high purity divinylbenzene was used, two types of polymerization initiators were added, and the polymerization was conducted at a temperature of 120° C. at the maximum. Consequently, the cross-linked copolymer having a small leachable polystyrene content was able to be obtained.
{ΔTOC Based on Ultrapure Water Flow Test}

Example 14

Ultrapure water having a resistivity of 18.2 MΩ·cm or more, a water temperature of 25° C., and a TOC of 0.5 μg/L was filled into an empty column having a diameter of 40 mm and a length of 500 mm under a room temperature condition, the ultrapure water was passed at SV of 60 hr$^{-1}$, and the TOC concentration ($TOC_0$) at the measurement column outlet was measured.

Subsequently, after 500 mL of the cation exchange resin of Example 11 was filled into the above-described measurement column, the above-described ultrapure water was passed through the column at SV of 60 hr$^{-1}$ under a room temperature condition, and the TOC concentration ($TOC_1$) at the measurement column outlet was measured.

The ΔTOC was calculated by the following formula. The results are shown in Table 6.

$$\Delta TOC = TOC_1 - TOC_0$$

In this regard, "A-1000" produced by Anatel Corp., was used as a TOC measuring instrument.

Comparative Example 10

The ΔTOC was calculated as in Example 14 except that a cation exchange resin for ultrapure water production (trade name EX-CG) produced by Kurita Water Industries Ltd., was used. The results are shown in Table 6.

Figure 6:
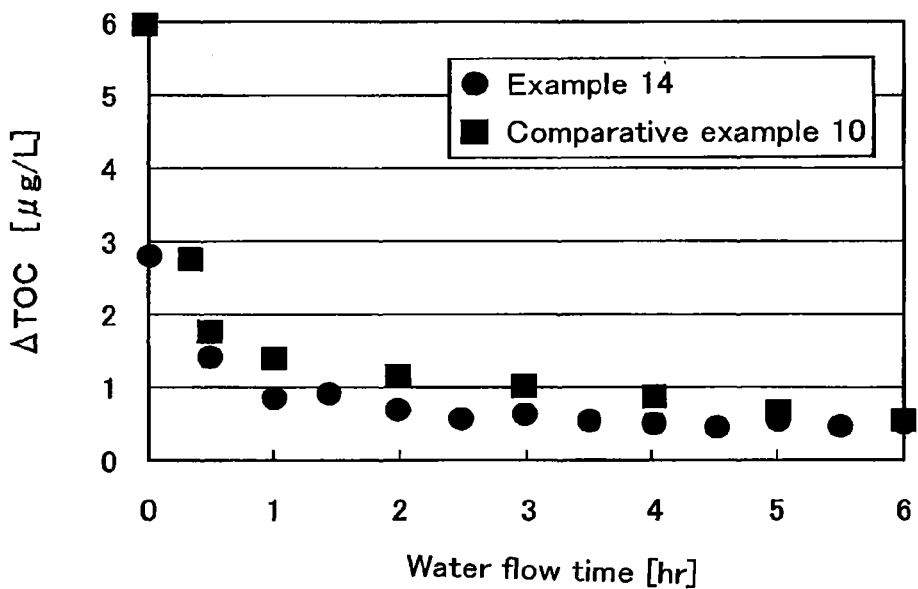
FIG. 6 is a graph showing the change with time of the ΔTOC based on an ultrapure water flow test of Example 14 and Comparative example 10 in Experimental example C.

As is clear from FIG. 6, regarding the resin of Example 14, the ΔTOC is low from the initial stage of water flow. Therefore, it is clear that the cation exchange resin obtained in the present invention exhibits low leachable of TOC as compared with other cation exchange resins.

The present invention has been described in detail with reference to specific aspects. However, it is apparent to those skilled in the art that various modifications could be made without departing from the spirit or scope of the present invention.

The present invention contains subject matters related to Japanese patent application filed on Apr. 19, 2007 (Japanese Patent Application No. 2007-110652), Japanese patent application filed on Apr. 19, 2007 (Japanese Patent Application No. 2007-110653), and Japanese patent application filed on Apr. 19, 2007 (Japanese Patent Application No. 2007-110654), the entire contents of which are incorporated herein by reference.

The invention claimed is:

1. A method for manufacturing a modified anion exchange resin, the method comprising contacting a water soluble polymer comprising an acid group with a starting anion exchange resin to produce a modified anion exchange resin,
wherein:
the anion exchange resin is a quaternary ammonium anion exchange resin;
the water soluble polymer comprises a linear polymer material comprising the acid group;
an amount of contact of the water soluble polymer is 0.01 to 10 mmol/L, in terms of an amount of the acid group, relative to 1 liter of the modified anion exchange resin; and
a wafer surface flatness (Rms) of the anion exchange resin is 4 Å or less, determined by a silicon wafer test.

2. The method of claim 1, wherein the acid group is at least one selected from the group consisting of a carboxylic group, a sulfonic group and salts thereof.

3. The method of claim 2, wherein the linear polymer material is at least one selected from the group consisting of a polystyrene sulfonate, a polyacrylate, a polymethyl methacrylate, a polymaleic acid and copolymers obtained from mixtures thereof.

4. The method of claim 3, wherein the linear polymer material is a polystyrene sulfonate.

5. The method of claim 1, wherein a molecular weight of the water soluble polymer ranges from 500 to 2,000,000.

6. The method of claim 1, wherein the amount of contact of the water soluble polymer is 0.1 to 2 mmol/L.

7. A modified anion exchange resin produced by the method of claim 1.

8. A mixed bed resin, comprising the modified anion exchange resin of claim 7.

9. The method of claim 1, wherein the starting anion exchange resin is a reduced-leachables anion exchange resin manufactured by:

(a) forming a cross-linked copolymer by copolymerizing a monovinyl aromatic monomer and a cross-linkable aromatic monomer;

(b) reducing a content of at least one leachable compound represented by formula (I) to 400 μg or less relative to 1 g of the cross-linked copolymer, to form a reduced-leachables cross-linked copolymer:

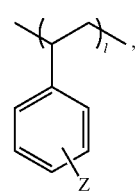

wherein Z represents a hydrogen atom or an alkyl group and l represents a natural number;

(c) halogenating the reduced-leachables cross-linked copolymer with a haloalkylating gent which enables the formation of a leachable compound represented by the following formula (II) to introduce 80 percent by mole or less of haloalkyl groups relative to the monovinyl aromatic monomer, to form a haloalkylated cross-linked copolymer;

(d) removing at least one leachable compound represented by formula (II) from the haloalkylated cross-linked copolymer, to form a reduced-leachables haloalkylated cross-linked copolymer:

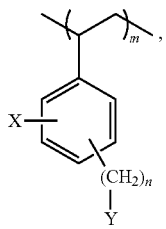

wherein X represents a hydrogen atom, a halogen atom, or an alkyl group optionally substituted by a halogen atom, Y represents a halogen atom, and m and n independently represent a natural number; and (e) reacting the reduced-leachables haloalkylated cross-linked copolymer with an amine compound to form a reduced-leachables anion exchange resin wherein said leachable compound represented by formula (I) is a byproduct which is obtained in copolymerization of the monovinyl aromatic monomer and the cross-linkable aromatic monomer and which is unreacted or insufficiently reacted, and said leachable compound represented by formula (II) is the haloalkylated product of said leachable compound represented by formula (I).

10. The modified anion exchange resin of claim 7, wherein the starting anion exchange resin is a reduced-leachables anion exchange resin manufactured by:

(a) forming a cross-linked copolymer by copolymerizing a monovinyl aromatic monomer and a cross-linkable aromatic monomer;

(b) reducing a content of at least one leachable compound represented by formula (I) to 400 μg or less relative to 1 g of the cross-linked copolymer, to form a reduced-leachables cross-linked copolymer:

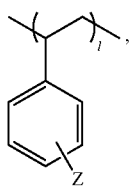

wherein Z represents a hydrogen atom or an alkyl group and l represents a natural number;

(c) halogenating the reduced-leachables cross-linked copolymer with a haloalkylating gent which enables the formation of a leachable compound represented by the following formula (II) to introduce 80 percent by mole or less of haloalkyl groups relative to the monovinyl aromatic monomer, to form a haloalkylated cross-linked copolymer;

(d) removing at least one leachable compound represented by formula (II) from the haloalkylated cross-linked copolymer, to form a reduced-leachables haloalkylated cross-linked copolymer:

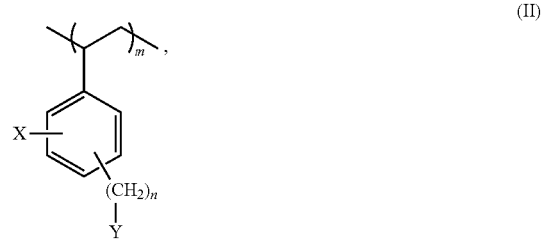

wherein X represents a hydrogen atom, a halogen atom, or an alkyl group optionally substituted by a halogen atom, Y represents a halogen atom, and m and n independently represent a natural number; and (e) reacting the reduced-leachables haloalkylated cross-linked copolymer with an amine compound to form a reduced-leachables anion exchange resin wherein said leachable compound represented by formula (I) is a byproduct which is obtained in copolymerization of the monovinyl aromatic monomer and the cross-linkable aromatic monomer and which is unreacted or insufficiently reacted, and said leachable compound represented by formula (II) is the haloalkylated product of said leachable compound represented by formula (I).

* * * * *